(12) United States Patent
Sivathanu et al.

(10) Patent No.: US 9,576,007 B1
(45) Date of Patent: Feb. 21, 2017

(54) INDEX AND QUERY SERVING FOR LOW LATENCY SEARCH OF LARGE GRAPHS

(71) Applicant: GOOGLE INC., Mountain View, CA (US)

(72) Inventors: Muthian Sivathanu, Bangalore (IN); Puneet Garg, Bangalore (IN); Rajesh S R, Bangalore (IN)

(73) Assignee: Google Inc., Mountain View, CA (US)

(*) Notice: Subject to any disclaimer, the term of this patent is extended or adjusted under 35 U.S.C. 154(b) by 321 days.

(21) Appl. No.: 14/101,878

(22) Filed: Dec. 10, 2013

Related U.S. Application Data

(60) Provisional application No. 61/785,184, filed on Mar. 14, 2013, provisional application No. 61/740,754, filed on Dec. 21, 2012.

(51) Int. Cl.
*G06F 7/00* (2006.01)
*G06F 17/30* (2006.01)

(52) U.S. Cl.
CPC .... *G06F 17/30321* (2013.01); *G06F 17/3053* (2013.01)

(58) Field of Classification Search
CPC ........... G06F 17/3002; G06F 17/30011; G06F 17/30253; G06F 17/30265; G06F 17/30277
See application file for complete search history.

(56) References Cited

U.S. PATENT DOCUMENTS

| | | | | |
|---|---|---|---|---|
| 6,301,584 B1 * | 10/2001 | Ranger | ............. | G06F 17/30607 |
| 6,775,666 B1 * | 8/2004 | Stumpf | ............. | G06F 17/30663 |
| 7,054,877 B2 * | 5/2006 | Dettinger | .......... | G06F 17/30398 |
| | | | | 707/718 |
| 7,650,357 B2 * | 1/2010 | Lin | .................... | G06F 17/30448 |
| | | | | 707/999.102 |
| 8,022,019 B2 * | 9/2011 | Rush | ..................... | B02C 17/002 |
| | | | | 241/15 |
| 8,051,104 B2 | 11/2011 | Weissman et al. | | |
| 8,751,505 B2 * | 6/2014 | Carmel | ............. | G06F 17/30604 |
| | | | | 707/742 |
| 8,774,835 B2 * | 7/2014 | Cherifi | ............. | G06F 17/30528 |
| | | | | 455/414.3 |

(Continued)

OTHER PUBLICATIONS

Wu, et al, "WebIQ: Learning from the Web to Match Deep-Web Query Interfaces", 2006, 10 pages.

*Primary Examiner* — Daniel Kuddus
(74) *Attorney, Agent, or Firm* — Brake Hughes Bellermann LLP

(57) ABSTRACT

A search index for searching a graph-based data store can include triple entries, each triple entry having a posting list value, at least one intersection identifier associated with the posting list value, and at least one result identifier associated with the intersection identifier. The index may also include search entries having a posting list value that corresponds to a text search aid. The search index may also include pre-computed path entries, such as chain path entries and converge path entries. The index may also include bucket posting lists representing ranges of object values for a particular predicate and proximity posting lists that include one or more entities and the areas of a location hierarchy with locations within the proximity of the entity. Queries for the data graph may have at least two stages, each stage being associated with a posting list from a graph index.

26 Claims, 19 Drawing Sheets

(56) References Cited

U.S. PATENT DOCUMENTS

| | | | |
|---|---|---|---|
| 8,983,995 B2* | 3/2015 | Hsu | G06F 17/3064 |
| | | | 705/26.62 |
| 8,990,241 B2* | 3/2015 | Wu | G06F 17/3064 |
| | | | 707/752 |
| 2004/0015909 A1* | 1/2004 | Cho | G06F 17/30622 |
| | | | 717/143 |
| 2005/0009520 A1* | 1/2005 | Herrero | H04L 29/12188 |
| | | | 455/435.1 |
| 2007/0078880 A1* | 4/2007 | Eiron | G06F 17/30734 |
| 2009/0094019 A1* | 4/2009 | Snow | G06F 17/2755 |
| | | | 704/9 |
| 2010/0223266 A1* | 9/2010 | Balmin | G06F 17/30864 |
| | | | 707/748 |
| 2011/0022591 A1* | 1/2011 | Stiffelman | G06F 17/30864 |
| | | | 707/728 |
| 2011/0022600 A1* | 1/2011 | Sathe | G06F 17/30622 |
| | | | 707/742 |
| 2011/0238659 A1* | 9/2011 | Chittar | G06F 17/3025 |
| | | | 707/724 |
| 2012/0036123 A1* | 2/2012 | Hasan | G06F 17/30386 |
| | | | 707/723 |
| 2012/0215785 A1 | 8/2012 | Singh et al. | |
| 2013/0159298 A1* | 6/2013 | Mason | G06F 17/30867 |
| | | | 707/728 |

* cited by examiner

INDEX AND QUERY SERVING FOR LOW LATENCY SEARCH OF LARGE GRAPHS

RELATED APPLICATIONS

This application claims priority under 35 U.S.C. §119 to Provisional Patent Application Ser. No. 61/740,754, entitled "EFFICIENT INDEX FOR LOW LATENCY SEARCH OF LARGE GRAPHS" filed on Dec. 21, 2012 and to Provisional Patent Application Ser. No. 61/785,184, entitled "INDEX AND QUERY SERVING FOR LOW LATENCY SEARCH OF LARGE GRAPHS" filed on Mar. 14, 2013. The subject matter of these earlier filed applications is hereby incorporated by reference.

BACKGROUND

Large search engines traditionally create and store an index that enables a user to search for one or more words in the content of documents. Such a search engine may store the document content, such as text, and an index that indicates what phrases appear in the content of each document. Such an index can comprise posting lists, where a posting list typically tracks a list of documents, or a first dimension, for each phrase, or posting list value. Such indexes work well for a document corpus such as the internet, but may not be used to search data graphs efficiently. A data graph stores nodes, or entities, and the relationships between the nodes. The one-dimensional posting list model used by a search index often cannot efficiently search for information in a data graph.

SUMMARY

Featured herein are systems and methods for searching, storing, managing, and serving information in a data graph. Some implementations include a two dimensional index for searching a data graph. The input to an indexing process may be triples selected from the graph, where a triple represents two entities and the relationship between them, for example in a <subject; predicate; object> format. In addition to triples obtained directly from the data graph, the system may also create additional triples to assist text searches of the graph. In addition to search triples, the additional triples may also include reverse triples, for example in the format <object, predicate$^{-1}$, subject>, where predicate$^{-1}$ is the reverse relationship of the relationship in the original triple, and the subject and object are from the original triple. Additional entries for indexing may include artificial triples that enhance text searches of the data. Some implementations may also include chain-path posting lists and converge-path posting lists. Chain-path posting lists and converge-path posting lists may represent pre-computed intersections of posting lists where the number of members of each set before the intersection is large but the result of the intersection is small. Such pre-computation allows very quick access to the small result set in exchange for a minimal amount of index space. Entries in the two dimensional index may have a posting list value, intersection identifiers (or a first dimension), and result identifiers (or a second dimension). Each posting list value may have one or more intersection identifiers, and each of the intersection identifiers may have one or more result identifiers.

Some implementations include additional index structures to support low-latency range queries. Range queries may include numerical ranges or proximity ranges. Bucketed posting lists can be added to the index to improve query latency for numerical ranges and proximity predicates are created and indexed to improve query latency for proximity ranges. In some implementations, the query execution process may include a forward path and a reverse path, with pruning and manipulation of the query result occurring during the reverse path as well as the forward path. Such implementations may also use an entity map to facilitate the pruning and manipulation in the reverse path. In some implementations query processing may include two phases, a retrieval phase and a filling phase. Each stage of a query may keep track of its state, so that work generated in the retrieval phase can be reused in the filling phase.

In one aspect, a system includes a graph-structured knowledge base that supplies triples for indexing. A triple may represent a subject linked with an object by at least one relationship. The system may also include an indexing system that has at least one processor, and a memory storing an index for searching the graph-structured knowledge base. At least some entries in the index may have a posting list value, a plurality of intersection identifiers associated with the posting list value, and for each of the intersection identifiers, one or more result identifiers. The indexing system may also include a memory storing instructions that, when executed by the at least one processor cause the indexing system to generate a subject index entry, an object index entry, and a relationship index entry for at least some of the triples from the knowledge base. In some implementations the instructions may also cause the system to receive a search query from a user and use the index to respond to the search query.

In some implementations a subject index entry has a subject representation for the subject entry's posting list value, a predicate representation as an intersection identifier for the subject entry's posting list value, and an object representation as a result identifier for the intersection identifier for the subject entry's posting list value, an object index entry has an object representation as the object entry's posting list value, a relationship representation as an intersection identifier for the object entry's posting list value, and a subject representation as a result identifier for the intersection identifier for the object entry's posting list value, and a relationship index entry has a relationship representation as the relationship entry's posting list value, a subject representation as an intersection identifier for the relationship entry's posting list value, and an object representation as a result identifier for the intersection identifier for the relationship entry's posting list value. In some implementations for at least one particular triple the instructions further cause the indexing system to generate a reverse triple for the particular triple and to generate a subject index entry, a relationship index entry, and an object index entry for the reverse triple.

These and other aspects can include one or more of the following features. For example, for at least one particular triple the instructions may further cause the indexing system to generate a search triple corresponding to the particular triple, the search triple including the subject of the particular triple, a text search aid as the object of the search triple, and a special relationship that indicates the object is a search equivalent of the subject. In such implementations the instructions may also cause the indexing system to generate an object index entry based on the search triple. As another example, at least one of the result identifiers in the index may have a corresponding context value and/or the intersection identifiers can be sorted within posting list value. In another example the instructions may cause the indexing system to pre-compute entries for the index representing an intersection between a first posting list value and a second posting list value and store the pre-computed entries in the index. In such implementations, pre-computing entries can include determining that an amount of triples represented by entries for the first posting list value and an amount of triples represented by entries for the second posting list value are large, determining a result of an intersection between the entries of the first posting list value and the entries of the second posting list value, and performing the pre-computing when it is determined that the result of the intersection has significantly fewer members than the amount of triples represented by the entries for the first posting list and significantly fewer members than the amount of triples represented by the entries for the second posting list value. Pre-computing entries can include precomputing a converge path and/or a chain path.

In some implementations pre-computing entries can include determining that an amount of intersection identifiers for the first posting list value and that an amount of intersection identifiers for the second posting list value are large, determining an amount of intersection identifiers in common between the first posting list value and the second posting list value, determining whether the amount of intersection identifiers in common is significantly less than the amount of intersection identifiers for the first posting list value and significantly less than the amount of intersection identifiers for the second posting list value, and generating a representation for a combination of the first posting list value and the second posting list value when it is determined that the amount of intersection identifiers in the intersection is significantly less. In such implementations storing the pre-computed entries in the index includes inserting a third entry into the index for each intersection identifier in common. The third entry may include the representation of the combination as the posting list value for the third entry, and the intersection identifier in common as the intersection identifier.

In some implementations pre-computing entries can include determining that an amount of intersection identifiers associated with the first posting list value and that an amount of intersection identifiers associated with the second posting list value are large, determining an amount of result identifiers for an intersection between the result identifiers of the first posting list value with the intersection identifiers of the second posting list value, determining whether the amount of result identifiers from the intersection is sufficiently small, and generating a representation for a combination of the first posting list value and the second posting list value when it is determined that the amount of result identifiers from the intersection is sufficiently small. In such implementations, storing the pre-computed entries in the index can include inserting a third entry into the index. The third entry may include the representation of the combination as the posting list value for the third entry, an intersection identifier from the intersection that is associated with the first posting list value as the intersection identifier for the third entry, and a result identifier from the intersection that is associated with the intersection identifier from the intersection as the result identifier for the third entry.

In another aspect, a search index for searching a graph-based data store can include a plurality of triple entries, each triple entry having a posting list value, at least one intersection identifier associated with the posting list value, and at least one result identifier associated with the intersection identifier. The index may also include a plurality of search entries, at least some search entries having a posting list value that corresponds to a text search aid, at least one intersection identifier associated with the posting list value that corresponds to a special relationship that indicates the posting list value is a text search aid, and at least one result identifier for the special relationship that identifies an entity in the graph. The index may be stored on one or more computing systems in communication with an indexing server and a query server. In some implementations, the search index may also include pre-computed path entries. The pre-computed path entries can include a plurality of chain path entries, each chain path entry having a posting list value that represents at least two edges in the graph, at least one intersection identifier associated with the posting list value that represents a first entity in the graph, and at least one result identifier that represents a second entity in the graph, the first entity being connected to the second entity in the graph by the at least two edges. The search index may also include a plurality of converge path entries, each converge path entry having a posting list value that represents at least two edges in the graph, and at least one intersection identifier associated with the posting list value, the at least one intersection identifier associated with a third entity in the graph, the third entity being an object of the at least two edges in the graph.

These and other aspects can include one or more of the following features. For example, the query server can include at least one processor and a memory storing instructions that, when executed by the at least one processor, cause the query server to perform operations. The operations may include receiving a query, the query relating at least to a particular pre-computed path in the index and determining changed entities for the at least two edges. The operations may also include recalculating the particular pre-computed path for the changed entities and determining results responsive to the query using the recalculated pre-computed path. In such implementations determining the changed entities may include determining a list of delta identifiers from a list of updated entities for the at least two edges of the particular pre-computed path. Recalculating the particular pre-computed path may include generating delta entries for the particular pre-computed path by re-calculating the particular pre-computed path for the entities corresponding to the delta identifiers and merging the delta entries with the pre-computed path entries for the particular chain path and discarding a particular entry from the pre-computed path entries when the intersection identifier of the pre-computed path entry matches a delta identifier to create updated entries.

In another aspect, a computer-implemented method includes obtaining, using at least one processor, a plurality of triples from a graph-based data store. Each triple entry may have a subject, an object, and a relationship, the subject and the object being entities in the graph. The method also includes determining a frequency of each entity represented in the plurality of triples and a frequency of each relationship represented in the plurality of triples, assigning identifiers to the entities, with more frequent entities receiving identifiers with a smaller memory footprint, and generating, using the at least one processor, a subject index entry and a relationship index entry for each of the triples. In some implementations the method may further include generating artificial triples for at least some of the plurality of triples and generating an object index entry for each artificial triple. In some implementations the method may also include generating an object index entry for at least some of the plurality of triples, generating chain-path index entries based on intersections from frequently occurring entities, and/or generating converge-path index entries based on intersections from frequently occurring relationships.

In another aspect, a system includes a graph-based datastore representing entities connected by predicates and a query serving system. The query serving system may include at least one processor, memory storing an index of the graph-based datastore, the index including predicate posting lists, and memory storing instructions that, when executed by the at least one processor cause the query serving system to receive a query that executes in at least two stages, each stage associated with a posting list from the index, execute a forward query path on the stages to generate first query results, and execute a reverse query path on the stages to generate second query results, where the first query results include different entities than the second query results. In some implementations, executing the forward query path include applying an expand operator on the predicate posting list for a first stage to generate intersection identifier-result identifier pairs, generating a list of result identifiers as first stage query results, and providing the first stage query results to a downstream stage as incident identifiers. In such implementations, executing the forward query path may also include generating an entity map from the intersection identifier-result identifier pairs, the entity map being indexed by result identifier. In some implementations executing the forward query path may also include intersecting the incident identifiers with intersection identifiers from the predicate posting list for the downstream stage to generate the first query results. executing the reverse query path may include providing the first query results to the first stage and using the entity map and the first query results to generate the second query results. In some implementations, using the entity map includes intersecting the first query results with the result identifiers of the entity map to find matching result identifiers and selecting the intersection identifiers associated with matching result identifiers as the second query results.

These and other aspects can include one or more of the following features. For example, the downstream stage may include a sub-query and the memory may further store instructions that, when executed by the at least one processor, cause the query serving system to perform a retrieval phase that determines a minimum set of entities and perform a filling phase that obtains details for the minimum set of entities. As another example, executing the reverse query path can include further processing of the first query results to generate the second query results. In some implementations, entities of the first query results may differ in type from the entities of the second query results and executing the reverse query path may translate the entities of the first query results into the entities of the second query results.

In another aspect, a computer-implemented method includes receiving, using at least one processor, a query for information from a data store that stores a graph represented by entities connected by predicates. The query may include at least two stages. The method may include executing, using the at least one processor, the stages according to a forward query path to determine a forward path results, the stages storing a state after execution that includes query results determined for the stage during the forward path, initiating a reverse query path using the forward path results, the reverse query path causing a particular stage to prune the query results determined for the particular stage in the forward query path based on input received from a downstream stage, and providing information from query results generated in the reverse query path as final query results.

These and other aspects can include one or more of the following features. For example, at least one stage may be a sub-query and the method further includes initiating a filling phase from the at least one stage during the reverse path. As another example, a first stage may include an expand operator and executing the stages according to the forward query path may include applying the expand operator to a predicate posting list for the first stage, generating intersection identifier-result identifier pairs, generating an entity map from the intersection identifier-result identifier pairs, the entity map being indexed by result identifier, generating a list of result identifiers as first stage query results, and providing the first stage query results to a downstream stage as incident identifiers. In such implementations, the list of result identifiers may be stored as part of the state after execution for the first stage and/or the entity map may be stored in a posting list format. As another example, at least one stage may include a traverse operator.

In another aspect, a computer system comprises memory storing a graph represented by entities linked by predicates, memory storing an index of the graph, the index including posting lists, at least some of the posting lists being predicate posting lists having a subject entity linked by the predicate to at least one object entity, at least one processor, and memory storing instructions that, when executed by the at least one processor, cause the computer system to perform operations. The operations may include receiving a query, the query including at least one stage that invokes parallel processing, and executing the query in two phases, a retrieval phase that generates a subset of entities, and a filling phase that obtains details for the subset of entities. In some implementations, the operations may also include initiating the filling phase during a reverse query path. These and other aspects can include one or more of the following features. For example, the parallel processing may include a sub-query, executing the retrieval phase may include storing a state for the stage, the state being identified by a query identifier, and/or the subset of entities may be a minimum number of entities that satisfy the query.

In another aspect, a system includes a graph-based data store representing entities connected by predicates and a query serving system. The query serving system may include at least one processor and memory storing an index of the graph-based data store, the index including two dimensional posting lists. The query serving system may also include memory storing instructions that, when executed by the at least one processor cause the query serving system to receive a query that executes in at least two stages, each stage associated with a posting list from the index, execute a forward query path on the stages to generate first query results, and execute a reverse query path on the stages to generate second query results, where the first query results differ from the second query results. In some implementations, executing the forward query path includes applying an expand operator on the posting list for a first stage to generate intersection identifier-result identifier pairs, generating a list of result identifiers as first stage query results, and providing the first stage query results to a downstream stage as incident identifiers. In such implementations, executing the forward query path may also include generating an entity map from the intersection identifier-result identifier pairs, the entity map being indexed by result identifier and intersecting the incident identifiers with intersection identifiers from the posting list for the downstream stage to generate the first query results. In such implementations, executing the reverse query path can include providing the first query results to the first stage and using the entity map and the first query results to generate the second query results. Using the entity map may include intersecting the first query results with the result identifiers of the entity map to find matching result identifiers and selecting the intersection identifiers associated with matching result identifiers as the second query results.

In another aspect, a system may include a graph-based data store and an indexing system. The indexing system may include at least one processor and a memory storing an index for searching the graph-based data store, the index including posting lists for one or more proximity ranges compatible with a space. A posting list can include one or more entities of a type compatible with the space, each entity having a location within the space, the location being a basic unit in a location hierarchy for the space and, for each entity, at least one node in the location hierarchy that falls within the proximity range of the posting list with reference to the location of the entity. The system may also include a memory storing instructions that, when executed by the at least one processor cause the indexing system to use the index to respond to a query that includes a query proximity range for the space. The space can be a geographic space or a time space.

These and other aspects can include one or more of the following features. For example, the at least one node may have a respective associated context that represents the location for the entity and/or the index may further include a distance-predicate posting list. A distance-predicate posting list can include nodes in the location hierarchy and, for each node, one or more entities of a type compatible with the space and located within an area represented by the node. In such an implementation responding to the query can include identifying at least one base entity associated with entity parameters from the query, selecting a posting list with a proximity range larger than the query proximity range, using the selected posting list to locate the one or more nodes for the at least one base entity, using the distance-predicate posting list to locate one or more target entities for the at least one base entity, and generating a query result that includes information for the at least one base entity and the one or more target entities. The one or more entities of the distance-predicate posting list may have an associated context that represents the location for the associated entity in base units and locating the one or more target entities may include calculating a distance between the base entity and the target entity using the context of the target entity and including the target entity in the query result when the distance is within the proximity range for the query.

As another example, the distance-predicate posting list can include forward distance-predicate entries. The forward distance-predicate entries can include a plurality of entities of a type compatible with the space and, for each entity, the nodes in the location hierarchy that represent an area encompassing the location of the entity. In such an implementation, responding to the query can include determining that a posting list with a proximity range larger than the query proximity range does not exist and using the forward distance-predicate entries to locate the one or more nodes for the at least one base entity.

As another example, responding to the query may include calculating a location that corresponds to a basic unit of the hierarchy from a value specified in the query, determining the nodes in the hierarchy with an area covering the query proximity range, using the distance-predicate posting list to locate one or more target entities for the location, and generating a query result that includes information for the one or more target entities.

In another aspect, a system includes a graph-based data store that includes geographic entities having an associated location in a geographic space and a location hierarchy for the geographic space. The location hierarchy may include a root node that represents the geographic space, internal nodes representing area portions of the geographic space, and leaf nodes, a leaf node representing a basic unit of the geographic space. Nodes at each level of the hierarchy may represent a division of the area represented by the parent node. The system may also include an indexing system that includes at least one processor and a memory storing an index for searching the graph-based data store, the index including posting lists for one or more proximity ranges. The posting list can include one or more geographic entities and, for each entity, at least one area of the geographic space that represents locations falling within the proximity range of the posting list with reference to the entity, the area being a node in the location hierarchy. The indexing system may also include a memory storing instructions that, when executed by the at least one processor cause the indexing system to use the index to respond to a query that includes a query proximity range for the geographic space.

These and other aspects can include one or more of the following features. For example, the index may further include a distance-predicate posting list. The distance-predicate posting list may include areas of the geographic space, each area representing one or more locations in the geographic space, and, for each area, one or more geographic entities located within the area. In such implementations, responding to the query can include identifying at least one base entity associated with entity parameters from the query, selecting a posting list with a proximity range larger than the query proximity range, using the selected posting list to locate the areas associated with the at least one base entity; using the distance-predicate posting list to locate one or more target entities for the at least one base entity, the target entities being associated with the located areas; and generating a query result that includes information for the at least one base entity and the one or more target entities. As another example, the proximity range of a posting list can be a radius of a predetermined number of miles.

In another aspect, a method includes receiving, using at least one processor, a query for a data store that stores a graph represented by entities connected by edges, at least some of the entities having a location within a space, the query including a query proximity range and entity parameters, and determining at least one base entity from the graph, the base entity satisfying the entity parameters and having a location within the space. The method may also include selecting a proximity posting list from an index for the graph associated with a predetermined proximity range larger than the query proximity range. The proximity posting list can include an entry for the base entity and at least one area of the space associated with the base entity, the area representing locations in the space falling within the predetermined proximity range from the base entity. The method may also include using the selected proximity posting list to locate the at least one area associated with the base entity, locating one or more target entities from the graph using a distance-predicate posting list in the index that maps an area of the space to entities in the graph with locations within the area, and generating, using the at least one processor, a query result that includes information for the base entity and the one or more target entities.

These and other aspects can include one or more of the following features. For example, hundreds of thousands of entities may satisfy the entity parameters and locating the target entities may take hundreds of milliseconds. As another example, one or more entities of the distance-predicate posting list may have a respective associated context that represents the location in base units for the target entity. In such an implementation locating the one or more target entities can include calculating a distance between the base entity and the target entity using the context of the target entity, and including the target entity in the query result when the distance is within the query proximity range. As another example, the space is a geographic space and the predetermined proximity range is a radius of a predetermined number of miles.

In another aspect, a computer system comprises a memory storing a graph represented by entities linked by predicates, a memory storing an index for the graph, the index including posting lists, at least some of the posting lists being predicate posting lists having a subject entity linked by the predicate to at least one object entity, and at least one processor. The system may also include a memory storing instructions that, when executed by the at least one processor, cause the computer system to determine unique object values for object entities associated with a first predicate from the graph, divide the object values into groups, where groups are defined by a start object value and an end object value, generate a posting list for each group that includes identifiers for subject entities that are related to object entities by the first predicate, where the object entities have object values that fall between the start object value and end object value, and store the posting list in the index. The first predicate may be identified as a filterable predicate in the graph.

These and other aspects can include one or more of the following features. For example, the memory may also store instructions that further cause the computer system to assign a rank to the unique object values and use the ranks to divide the object values into groups. In such an implementation the system may also include memory storing a mapping between ranks and object values and the start object value and the end object value may be represented by respective ranks. As another example, the memory may further stores instructions that cause the computer system to generate an object-rank posting list for the predicate that stores the subject entities and for each subject entity, the at least one object entity with the rank of the object value as a context and store the object-rank posting list in the index. In some implementations, the memory stores instructions that cause the computer system to receive a search query from a user that includes a range represented by a query start value and a query end value, identify a group having a start object value smaller than or equal to the query end value or an end object value greater than or equal to the query start value, and use the posting list for the identified group to narrow entries in the index analyzed in responding to the search query.

As another example the memory may further store instructions that, when executed by the at least one processor, cause the computer system to generate two or more sets of groups, with each set representing a different granularity and store a posting list in the index for the groups in the two or more sets.

In another aspect, a search index for performing low-latency searches of a data graph, the data graph having entities linked by predicates, includes predicate posting lists, wherein a predicate posting list for a particular predicate includes subject entities and one or more object entities related to respective subject entities by the particular predicate and bucket posting lists that represent ranges of object values for a predicate, a bucket posting list for the particular predicate includes at least one subject entity related by the particular predicate to at least one object entity having an object value that falls within a start value and an end value for the bucket posting list. The search index is stored on one or more computing systems in communication with an indexing server and a query server and is used to generate search results in response to queries.

These and other aspects can include one or more of the following features. For example, the search index can also comprise object-rank posting lists, wherein an object-rank posting list for the particular predicate includes subject entities and one or more object entities related to respective subject entities by the particular predicate, wherein each object entity is associated with a rank; and wherein the start value and the end value for the bucket posting lists are associated with respective ranks. The rank may differ from the object value. In some implementations, the query server can include at least one processor and a memory storing instructions that, when executed by the at least one processor, cause the query server to receive a query that includes a range for the particular predicate, convert the range to a query start rank and a query end rank, and determine at least one bucket posting list for the particular predicate from the search index that has a start value less than the query end rank and an end value greater than the query start rank, the at least one bucket posting list having at least a first subject entity. The instructions may also cause the query server to determine first object entities related to the first subject entity using the object-rank posting list and the bucket posting list for the particular predicate, determine whether the first object entities have an associated rank within the query start rank and query end rank, and generate a query result that includes information from the first subject entity and the first object entities that have an associated rank within the query start rank and the query end rank. In such implementations the system may further comprise an object map that maps object values to ranks and wherein converting the range to a query start rank includes using the object map.

In another example the query server includes at least one processor and memory storing instructions that, when executed by the at least one processor, cause the query server to: receive a query that includes a range for the particular predicate, the range represented by a query start value and a query end value, determine at least one bucket posting list for the particular predicate from the search index that has a start value less than the query end value and an end value greater than the query start value, the at least one bucket posting list having at least a first subject entity, and determine first object entities related to the first subject entity using the predicate posting list and the bucket posting list for the particular predicate. The instructions may further cause the query server to determine whether the first object entities have an object value within the query start value and query end value and generate a query result that includes information from the first subject entity and the first object entities that have an object value within the query start value and the query end value.

In another example, the query server can comprise at least one processor and a memory storing instructions that, when executed by the at least one processor, cause the query server to receive a query that requests statistics for entities having specified characteristics, determine a set of entities with the specified characteristics, and identify predicates for bucket posting lists that include at least one entity in the set of entities. The instructions may further cause the query server to aggregate by predicate the object values for object entities related by the identified predicates to entities in the set of entities, generate, using the at least one processor, a histogram from the aggregated object values, and generate, using the at least one processor, a search result that includes information from the histogram.

In another example, the query server comprises at least one processor and a memory storing instructions that, when executed by the at least one processor, cause the query server to receive a query that includes a request to sort the search results by object entity for the particular predicate, determine, using the at least one processor, query results, the query results including first subject entities, order the query results based on the ranks of the object entities in a bucket posting list for the particular predicate, and provide information from the ordered query results as the search results.

In another aspect, a method includes receiving, by at least one processor, a query that includes a range for a particular predicate of a data graph. The range may be represented by a query start value and a query end value and the data graph may include subject entities linked by the particular predicate to object entities. The method may include determining, using the at least one processor, at least one bucket posting list for the particular predicate from an index for the data graph, the bucket posting list having an associated bucket start value that is less than the query end value and an associated bucket end value that is greater than the query start value, the bucket posting list identifying first subject entities for the particular predicate linked to object entities with object values between the bucket start value and bucket end value. The method may also include determining object entities related to the first subject entities using a predicate posting list for the particular predicate from the index for the data graph, determining whether the first object entities have respective object values within the query start value and query end value, and generating a query result that includes information from the first subject entities linked by the particular predicate to the first object entities that have an object value within the query start value and the query end value.

These and other aspects can include one or more of the following features. For example, the predicate posting list may be an object-rank posting list that includes a predicate rank associated with each object entity. As another example, the method may also include converting the query start value to a query start rank and the query end value to a query end rank, wherein the bucket start value and bucket end value correspond to predicate ranks. In some implementation object entities with the same object value receive the same predicate rank.

In another aspect, a non-transitory computer-readable medium may include instructions executable by at least one processor that cause a computer system to perform one or more of the methods described above.

One or more of the implementations of the subject matter described herein can be implemented so as to realize one or more of the following advantages. As one example, the system may enable low latency searches on massive graphs. For example, a search of a data graph with trillions of edges and billions of nodes may be accomplished in tens of milliseconds. Another advantage of using a two dimensional index is that it makes answering certain queries quick and efficient. For example, implementations may use a single posting list, for example a list with a posting list value of the predicate acted in to search for all movies that a given list of actors acted in. In a traditional document-based index, the same search may require reference to 100 or more posting lists rather than just one. As another example, the index enables arbitrary graph joins and graph traversal queries determined at query time. For example, implementations provide low-latency answers to queries that are difficult and time consuming to answer using a traditional text search corpus, such as "restaurants in San Francisco near a gas station." One or more implementations also provide efficient and effective update mechanisms for the index, including the ability to provide updates for pre-computed path posting lists, such as chain paths and converge paths.

As another example, one or more implementations may generate range-related posting lists to facilitate low-latency range queries. For example, bucketed posting lists may be generated that group entities by object value to allow a range query to quickly locate triples with object values falling in a range without having to traverse the entire posting list. In addition, interesting facts, such as histograms showing interesting statistics may be generated for a set of entities, such as the age of U.S. presidents or their spouses upon taking office, or the age of actors winning their first Oscar, using the range-related posting lists. As another example, proximity posting lists may address a proximity range query, for example, that asks for all restaurants within two miles of a gas station. Such a query may include gas stations for hundreds of thousands of restaurants, but may be served within tens of milliseconds using the proximity posting lists, which greatly reduce the number of pair-wise distance calculations needed to answer such a query.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
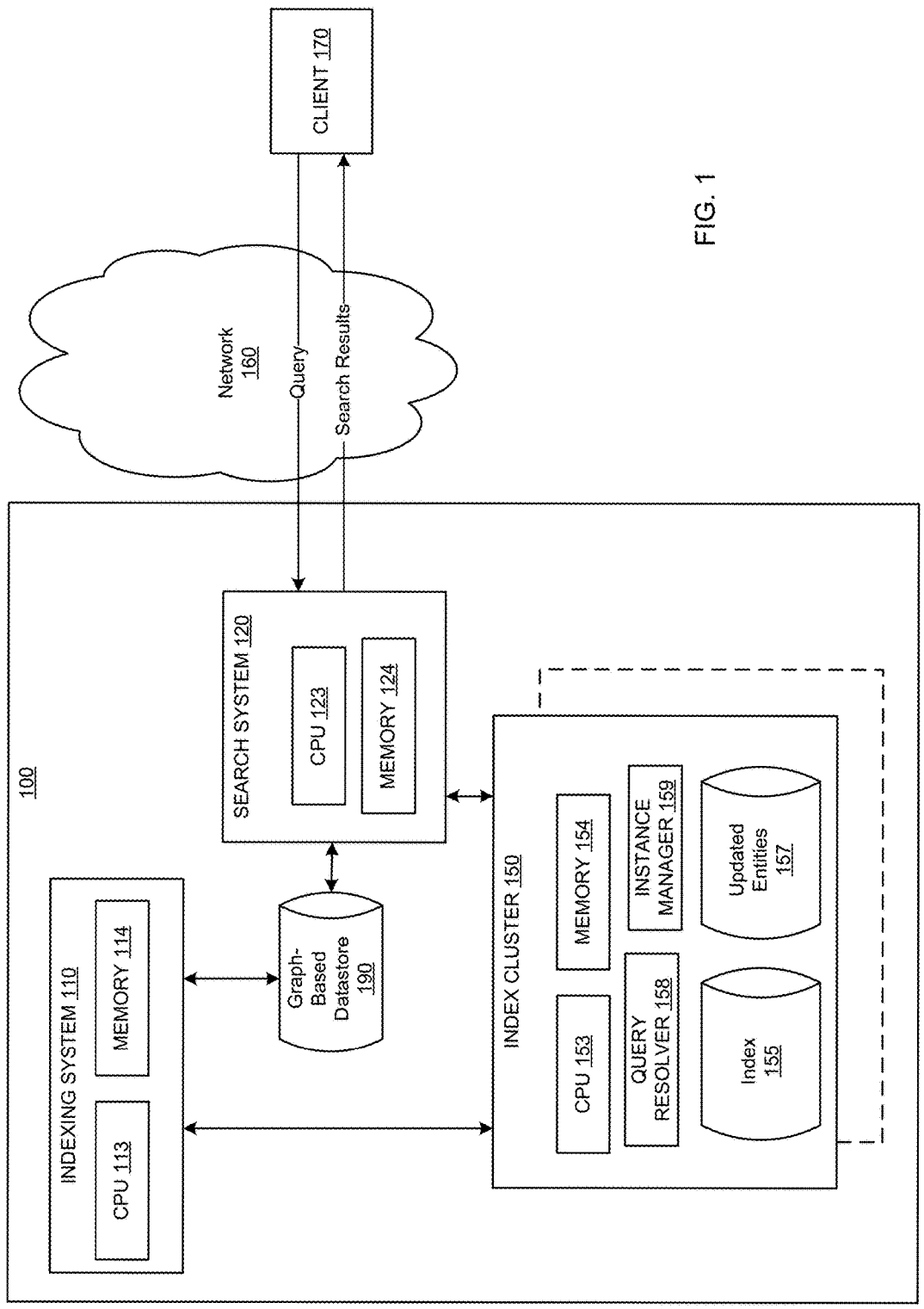
FIG. 1 illustrates an example system in accordance with the disclosed subject matter.

FIG. 1 is a block diagram of a data graph search system 100 in accordance with an example implementation. The system 100 may be used to implement a search engine for a data graph using the techniques described herein. The depiction of system 100 in FIG. 1 is described as a search engine system for a data graph that processes query requests from a client. Other configurations and applications of the described technology may be used. For example, the query request may originate from another server, from a batch job, or from a user terminal in communication with data graph search system 100.

Figure 17:
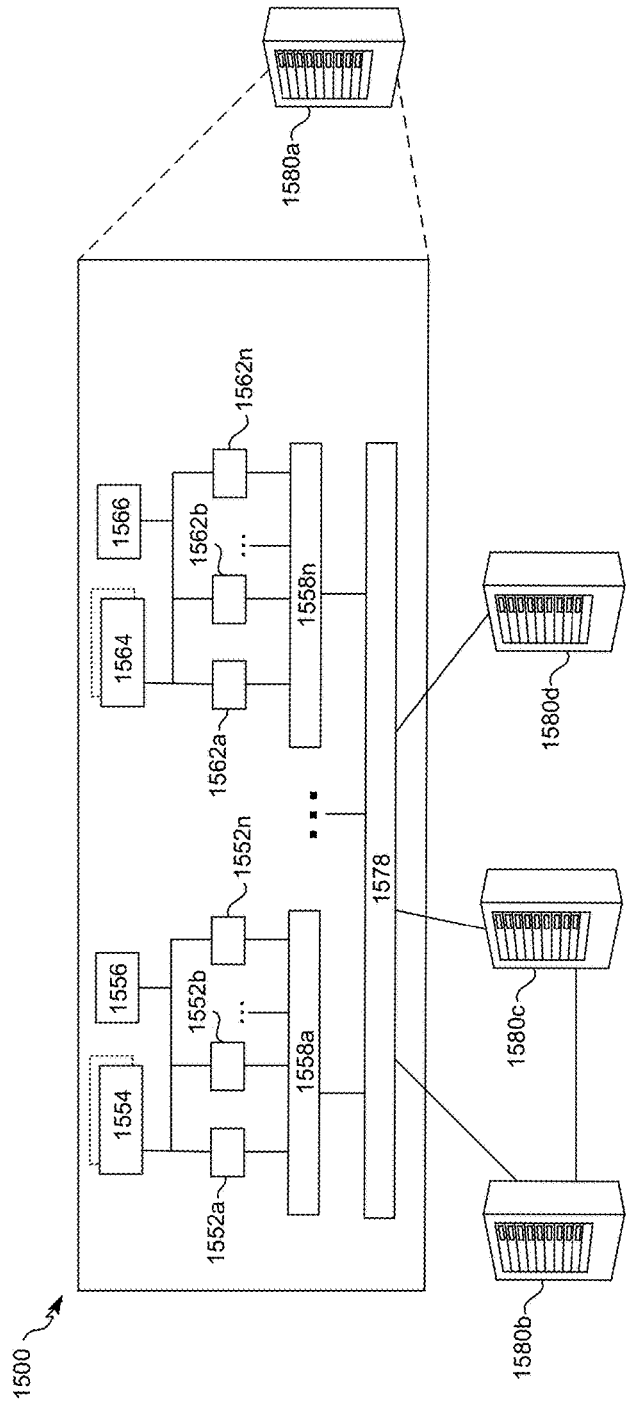
FIG. 17 shows an example of a distributed computer device that can be used to implement the described techniques.

The data graph search system 100 may include indexing system 110, search system 120, and index cluster 150. Indexing system 110, search system 120, and index cluster 150 may be computing devices that take the form of a number of different devices, for example a standard server, a group of such servers, or a rack server system. In addition, indexing system 110, search system 120, and index cluster 150 may be implemented in a personal computer, for example a laptop computer. The indexing system 110, search system 120, and index cluster 150 may be examples of computer device 1700, as depicted in FIG. 17.

The data graph search system 100 may include a graph-based data store 190. Such a data graph stores nodes and edges, from which a graph, such as the graph illustrated in FIG. 2 can be created. The nodes may be referred to as entities and the edges may be referred to as relationships between two entities. Such relationships may be stored in a number of ways. In one example, the graph-based data store 190 stores triples, also referred to as tuples, that represent the entities and relationships. A triple may include a <subject; predicate; object> format, with the subject representing a starting entity, the predicate representing an outward edge from the subject, and the object representing the entity pointed to by the outward edge. For example, in FIG. 2, one example of a triple is the entity Tom Hanks as the subject, the relationship acted in as the predicate, and the entity Larry Crowne as the object. Of course, a data graph with a large number of entities and even a limited number of relationships may have billions of triples. Although the example above shows a triple with a subject, predicate, and object, a triple is not limited to three fields and may include fewer or more fields. For example, a triple may also include one or more context fields, as will be explained in more detail below.

Indexing system 110 can include one or more processors 113 configured to execute one or more machine executable instructions or pieces of software, firmware, or a combination thereof. The indexing system 110 can include, an operating system (not shown) and one or more computer memories 114, for example a main memory, configured to store one or more pieces of data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules that, when executed by processor 113, perform certain operations. In other implementations, the modules may be stored in an external storage device (not shown) and loaded into memory 114. The modules, such as an indexer, may enable indexing system 110 to generate new index entries, update existing index entries, and generally maintain the index 155.

Like indexing system 110, search system 120 may include one or more processors 123, an operating system (not shown) and one or more computer memories 124. Search system 120 may include modules, stored in memory 124 or an external storage device (not shown) and loaded into memory 124 that enable the search system 120 to receive and respond to queries. Search system 120 may include one or more servers (not shown) that receive queries from a user of client 170 and provide those queries to the search system 120. The search system 120 may be responsible for searching the data graph and, in some implementations, other data sources, such as a corpus of documents from the Internet or an Intranet, in response to a query. For example, the search system 120 may receive a query from a client, such as client 170, perform some query processing, and send the query to index cluster 150 and to other indexing clusters that store indexes for searching other sources. In such an implementation, search system 120 may have a module that compiles the results from all sources and provides the compiled results to client 170. In some implementations, search system 120 may only send queries to index cluster 150 and may provide search results from index cluster 150 to client 170. Search system 120 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search system 120 may communicate with and transmit data to/from clients 170.

System 100 may also include an index cluster 150. Index cluster 150 may be a single computing device or a distributed database system with one or more computing devices, each with its own processor and memory. The number of computing devices that comprise index cluster 150 can vary and, for the sake of brevity, index cluster 150 is shown in FIG. 1 as a single entity. Each index cluster 150 can include one or more processors 153 configured to execute one or more machine executable instructions or pieces of software, firmware, or a combination thereof. The computing cluster 150 can include, an operating system (not shown) and one or more computer memories 154, for instance a main memory, configured to store one or more pieces of data, either temporarily, permanently, semi-permanently, or a combination thereof. Memory 154 may include any type of storage device that stores information in a format that can be read and/or executed by processor 153, including volatile memory, non-volatile memory, or a combination thereof. Index cluster 150 may also include one or more modules, such as query resolver 158, that processes a query; accesses the index 155, and retrieves results responsive to the query. In some implementations (not shown), query resolver 158 may be part of search system 120, or may be distributed between search system 120 and index cluster 150.

The index cluster 150 can also include an index 155 stored on a tangible computer-readable storage device configured to store data in a semi-permanent or non-transient form, for instance disk, flash, cache memory, or a combination of these. In some implementations, index 155 may be stored in a combination of various memories. For instance, some index entries may be stored in cache or flash memory, while others are stored in disk memory. In some implementations, index entries for a particular posting list may be stored in a combination of various memories. For example, the index may include entries organized by posting list value, and within the posting list value, the entries may be organized by intersection identifiers, and within the intersection identifiers, the entries may be organized by result identifiers. In other words, index 155 may be two-dimensional in that each posting list value tracks two dimensions, an intersection dimension, and a result dimension. A posting list value may represent an entity from the data graph, an edge from the data graph, or an artificial construct used for indexing purposes only. The entity or edge represented by the posting list value may be used to name of the posting list. For example, if the posting list value corresponds to the acted_in edge from the graph, the posting list may be referred to as the acted_in posting list. Of course, in the index 155 the posting list value may be an identifier assigned to the acted_in edge. For the purposes of this application, reference to a posting list includes references to the posting list value and vice versa. An example structure for index 155 is discussed in more detail below with regard to FIGS. 4A-B. In some implementations, the index may also include posting lists to assist in searching the graph. Such entries may represent artificial constructions that do not exist in the graph itself but may be created at indexing time to enhance graph-based query performance. For example, such additional posting lists may include search posting lists, reverse posting list entries, pre-computed path posting lists, and range query posting lists, as explained in more detail below.

In some implementations, index 155 may include pre-computed path posting lists representing intersections between posting lists. For example, for efficiency, the indexing system 110 may pre-compute certain intersections, or multi-hop paths, that have a large number of inputs but a small number of results. Such intersections are expensive to compute but cheap to store. For example, a chain path may represent a path of two or more edges in the graph, such as acted_in→directed_by to find the directors who directed a particular actor. As another example, a converge path may intersect two converging paths, such as actor; singer, to find entities who have both an actor and a singer profession. In such implementations, the posting list value may represent the relationships or entities involved in the intersection. In a converge path, the posting list may or may not have result identifiers, as will be explained in more detail below. In implementations with two or more index clusters 150, the indexes 155 on each index cluster 150 may, collectively, be considered the search index.

In some implementations, index 155 may include range query posting lists. Range query posting lists are created to facilitate low-latency responses to queries that include ranges of numerical or spatial values. For example, a query requesting actors over 5'6", television shows made from 1975-1985, hotels within 5 miles of an airport, or movies made within 5 years of a major war. Numerical range query posting lists may assign a rank to numerical object values, for example a birth year, and create a posting list for the birthdate edge that includes the rank as a context for the result identifier. Numerical range queries generally apply to predicates that have object values that can be ordered by some comparator. For example, the predicate birth date, which maps a person to their date of birth, can be ordered by increasing birth year, increasing birth year and month, etc. The value of the object, for example birth year, may be assigned a rank. The rank may represent the position of an object value in a sorted list of the values. For example, the year 1970 may have a lower rank than 1980 for the birth date predicate if birth years are sorted in ascending order. The rank of an entity with the same value as another entity may be the same. For example, the people born in 1970 may all have the same rank, if the rank is based on birth year.

In some implementations, the range query posting lists in the index 155 may include a object-rank posting list and a bucket posting list. The object-rank posting list has filterable predicates as posting list values, subjects as the intersection identifiers and objects as result identifiers, with the rank of an object included as a context for the result identifier. A bucket posting list divides the triples by rank into buckets of equal size. Thus, a first bucket may include ranks 1-10 and a second bucket may include ranks 11-20, etc. The index 155 may include multiple sets of buckets, so that a second set of buckets includes buckets divided into 1000 ranks rather than 10 ranks. Any number of bucket sizes and number of bucket sets may be included in index 155, depending on the predicate and the types of queries submitted against the predicate. The index 155 may store the starting rank and ending rank for each bucket in the set of bucket posting lists.

Range query posting lists may also include proximity posting lists. Proximity posting lists pertain to entities for which a neighborhood can be defined. A neighborhood includes a distance metric and a covering operator. For example, a geographic space can have a distance metric of miles, meters, inches, etc. used with a covering operator to define the neighborhood, for example, "within 5 miles" or "within 4 meters." As another example, a date/time space can have a distance metric of years, hours, seconds, etc., with a covering operator to define a neighborhood of, for example, "within 3 years," "within 6 seconds," etc. Proximity posting lists in the index 155 may include an artificial predicate representing the covering operator so that the artificial predicate links an entity to the neighborhood represented by the covered area. Proximity posting lists may also include a special distance predicate that links entities with each neighborhood. Range query posting lists are described in more detail below with regard to FIG. 4B.

Index cluster 150 may also include updated entities 157. Updated entities 157 may be a list of entities that have been updated since the last index build or refresh that is used to provide updated results for pre-computed index posting lists. The list of entities may be stored by predicate, so that the data graph search system 100 may identify which entities have changed for some or all of the predicates. Because the system may have hundreds of pre-computed posting lists that include a particular relationship, for example the relationship acted_in, adding a new triple to the graph that includes the acted_in relationship may result in changes to hundreds of pre-computed posting lists, which is quite inefficient for a large data graph, especially if the data graph is not static. Therefore, the index cluster 150 may track the entities that have been updated, added, or deleted for the acted_in relationship. This may allow the query resolver to determine whether to re-calculate the pre-computed path for a particular entity at query time, or to use the information in the pre-computed path from the index.

Indexing system 110 may be in communication with other computing devices that provide updates graph-based data store 190. For example, indexing system 110 may receive or discover new entities to be added to data store 190, new relationships between existing entities, removal of entities or relationships from the data store 190, etc. In some implementations, index cluster 150 may include a list of updated entities 157, which allows the data graph search system 100 to use pre-computed graph paths with real-time updates, as will be described below in greater detail.

The data graph search system 100 may operate over a large amount of data. For example, graph-based data store 190 may be a data graph of entities mentioned in documents available over the Internet. Such a source may be volatile in addition to being large. Accordingly, implementations seek to lower latency time while still providing the ability to query graph relationships and efficiently update the index. Of course, implementations may likewise be used for more limited collections or collections that have a more static nature.

Figure 2:
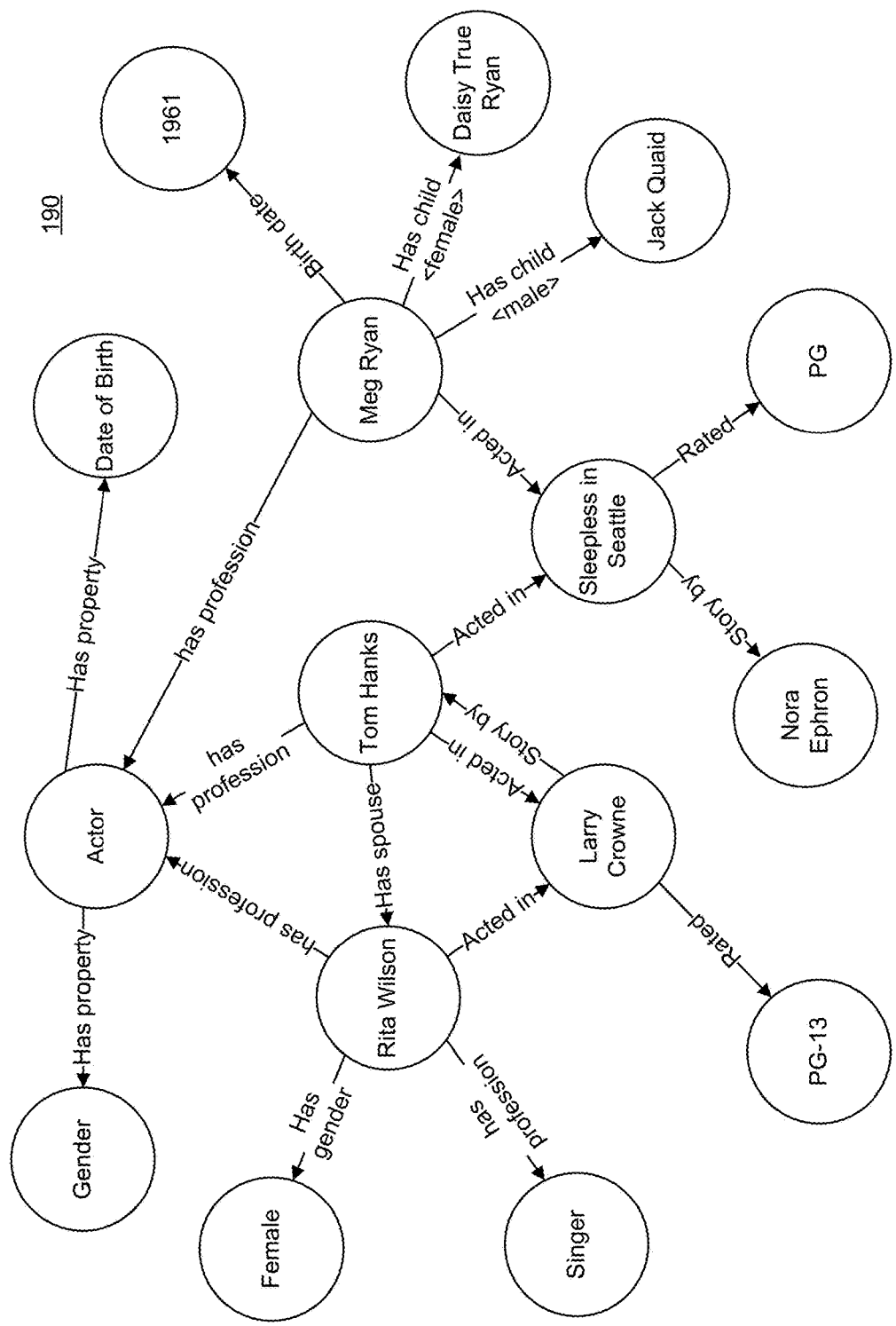
FIG. 2 illustrates a representation of a data graph, with entities as nodes and relationships as edges between nodes.
Figure 3:
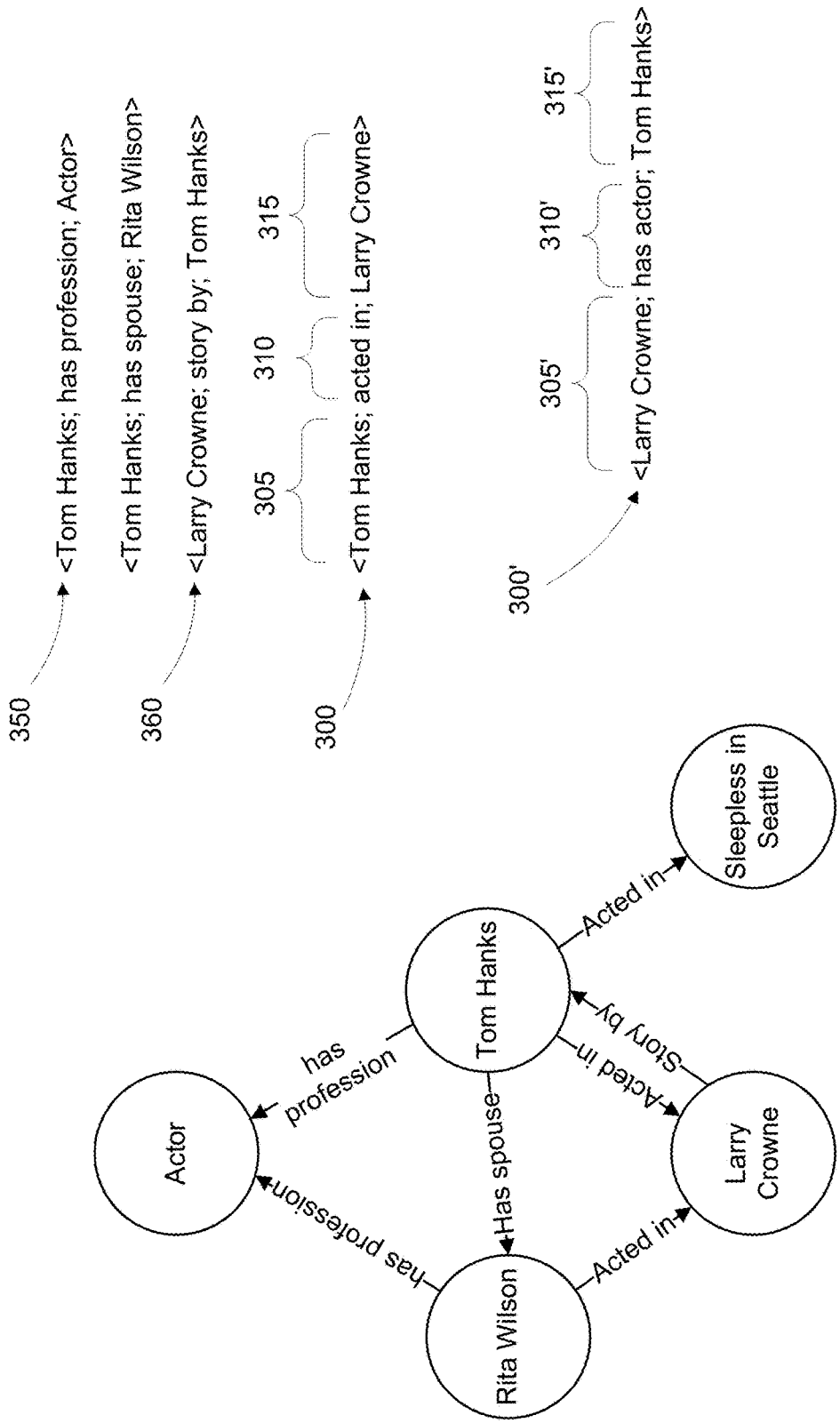
FIG. 3 illustrates a partial representation of the data graph of FIG. 2 and some examples of triples that may be used as input to create an index for the data graph of FIG. 2.

FIG. 3 illustrates a partial representation of the data graph of FIG. 2 and some examples of triples that may be used as input to create an index for the data graph of FIG. 2. In some implementations, the indexing system 110 may process triples from graph-based data store 190 as input to the indexing process. As previously discussed, unlike the one-dimensional posting list used in traditional search indexes, which has one or more document identifiers associated with a posting list value, a two dimensional posting list has one or more result identifiers associated with each intersection identifier, and one or more intersection identifier associated with each posting list value. In other words, the intersection identifiers may represent a first dimension for the posting list value and the result identifiers may represent a second dimension, being ordered within the first dimension. Also unlike posting lists for traditional search engines, two-dimensional posting lists can be created for any of the three dimensions of a triple.

For example, triple 350 of FIG. 3 may represent the path from the Tom Hanks entity to the Actor entity using the relationship has_profession. This may represent a one-hop path in the graph. Similarly, triple 360 may represent the path from the entity Larry Crowne to the entity Tom Hanks using the story_by relationship. Triple 300 of FIG. 3 is another example and represents the path from the Tom Hanks entity to the Larry Crowne entity using the relationship acted_in. In triple 300, Tom Hanks is the subject 305 of the triple, acted_in is the predicate 310, and Larry Crowne is the object 315. The subject 305 may be the entity where the path starts, the predicate 310 may be the outbound relationship and the object 315 may be the entity to which the outbound relationship leads. Going from the subject 305 to the object 315 may be an example of walking the graph. A walk may include any number of entities and relationships.

In addition to the triples actually stored in the data graph, the indexing system 110 may generate posting list entries representing a reverse predicate, or a reverse triple, that corresponds to the triple 300. For example, reverse triple 300' of FIG. 3 shows the reverse triple that corresponds to triple 300. The reverse predicate 310' may represent the inbound relationship that corresponds to the outbound relationship of predicate 310. In the example of FIG. 3, predicate 310 is acted_in, so the reverse predicate 310' may be "has actor" or "stars" or something similar. The name of the reverse predicate is not important, and in some implementations, the reverse predicate may only have an assigned identifier. In the reverse triple 300', the original subject 305 becomes the reverse object 315' and the original object 315 becomes the reverse subject 305'. Reverse triples enable a walk in the graph between any two entities that share an edge, no matter what direction the edge in the data graph actually points. Generating both forward and reverse posting lists allows the index to respond to a wide variety of queries efficiently.

As previously mentioned, an index for a data graph, such as index 155, may include posting list values for the subject, object, or predicate of a triple. Thus, each triple may be included in three different forward posting lists. In addition, each triple may have a reverse triple, and the reverse triple may be included in three different reverse posting lists. Thus, it is possible for one triple to generate six different posting list entries. There may be situations where including the triple in all six posting list entries is not cost effective or practical. For example, triples with an object that represents a decimal value, such as the height of a person, may not result in six different posting list entries because it is not anticipated that queries will reference the height (e.g., ask for all people who are 5 foot 6 inches tall). Similarly, if the value of a node changes often, like the stock price for a company, generating entries in six posting lists may not be practical because of the number of index updates. Thus, in some implementations, certain predicates may be identified as candidates for forward posting lists only, so that reverse posting list entries are not generated for the predicates.

Figure 4A:
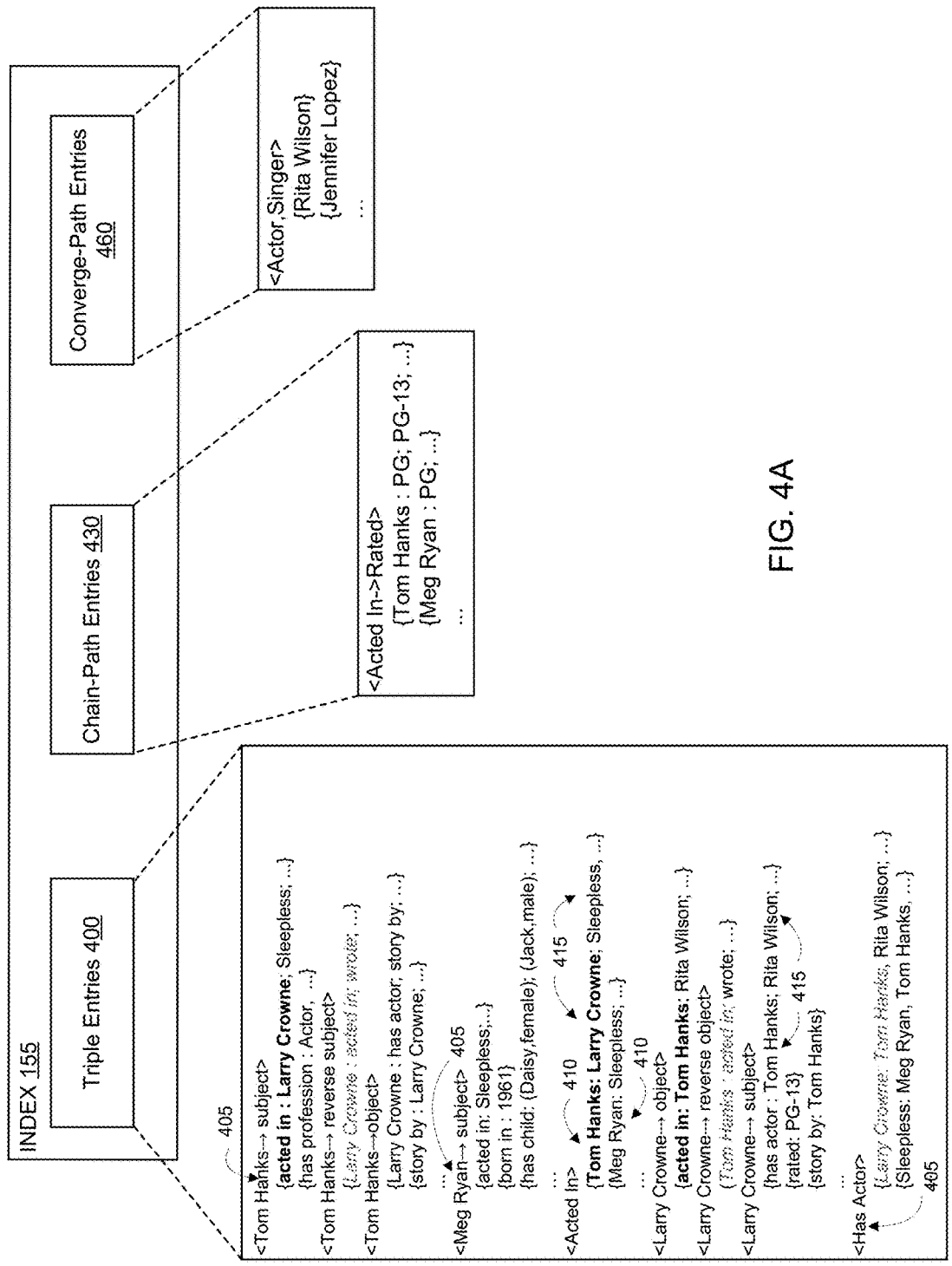
FIGS. 4A and 4B illustrate a representation of posting lists in an index for the data graph of FIG. 2.
Figure 4B:
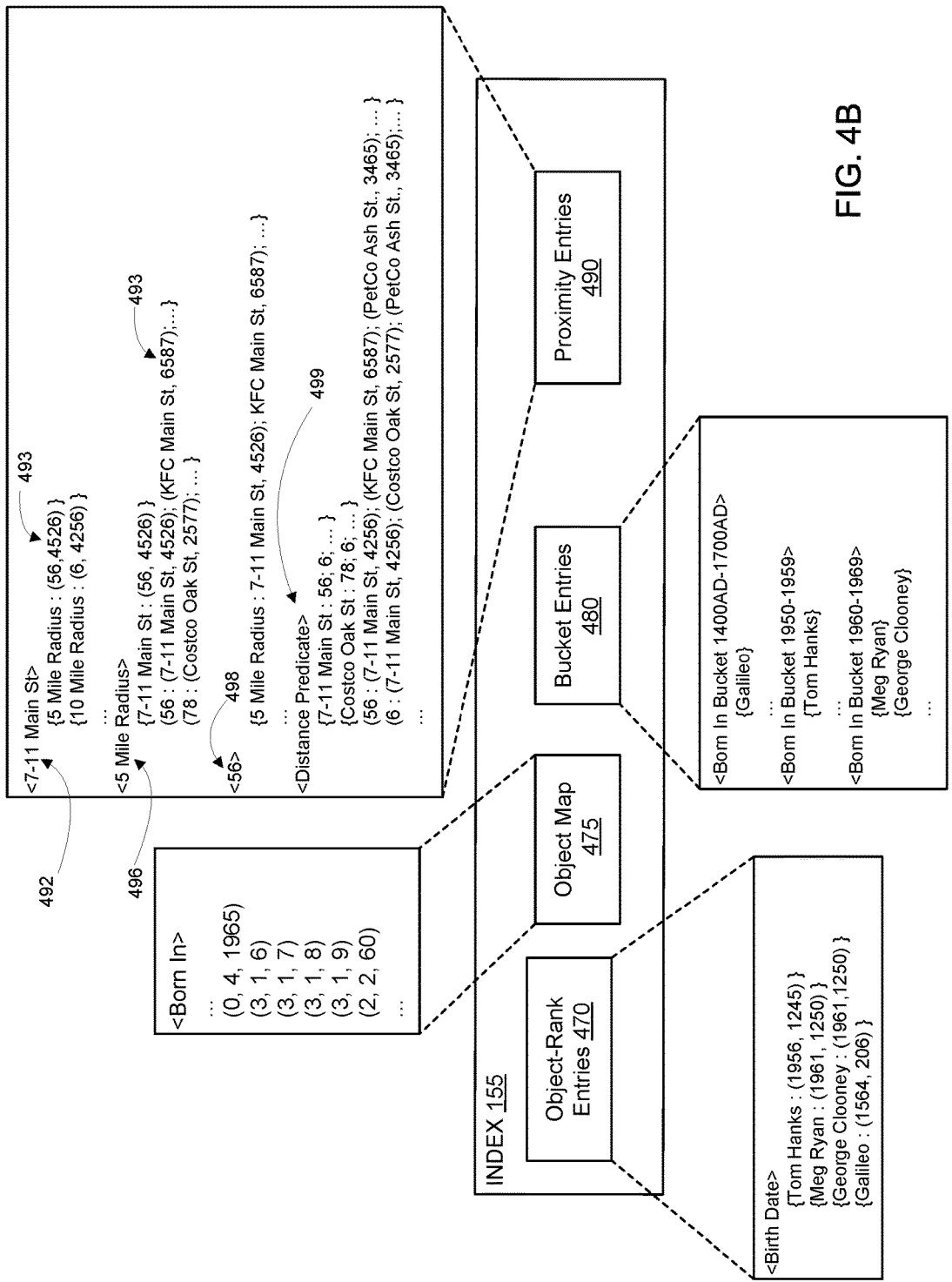

FIGS. 4A-B illustrate a representation of posting lists in an index, such as index 155 for the data graph of FIG. 2. In the example of FIG. 4A, triple posting lists 400 represent posting lists for triples and reverse triples stored in the graph. As shown in FIG. 4A, triple posting lists 400 may include posting list value 405, intersection identifiers 410, and for each intersection identifier 410, result identifiers 415. Although shown in FIG. 4A as text identifiers for readability, posting list values 405, intersection identifiers 410, and result identifiers 415 may be a numeric identifier, an alpha-numeric identifier, or other identifier that is assigned to a particular entity or relationship, as discussed in more detail below.

As mentioned above, each triple may be included in six different posting list entries. For example, triple 300 of FIG. 3 may be included in a subject posting list for <Tom Hanks>, a predicate posting list for <Acted In>, and an object posting list for <Larry Crowne>. The entries in bold in FIG. 4A represent the entries that correspond to triple 300 of FIG. 3. In addition, by generating reverse predicate, reverse subject, and reverse object posting list entries, the triple may also be included in three more posting list entries. In the reverse posting list, the Tom Hanks reverse subject posting list has Larry Crowne as the intersection identifier and the predicate acted in is the result identifier. In the reverse posting list for the Larry Crowne object, Tom Hanks is the intersection identifier and acted in as the result identifier. Thus, in reverse posting lists for entities, the predicate becomes the result identifier rather than the intersection identifier. The reverse posting list entries for the predicate posting list simply swaps the subject and object. In some implementations the reverse predicate posting list may be stored as a separate posting list, such as the <Has Actor> posting list shown in FIG. 4. In other implementations (not shown) the reverse predicate posting list may be stored in the <Acted In> posting list, but with the object as the intersection identifier and the subject as the result identifier. The forward and reverse posting lists for a predicate may be combined in the same posting list because the intersection identifiers and the result identifiers are both entities. The entries in italics in FIG. 4A represent the entries that correspond to the reverse posting lists of triple 300 of FIG. 3. Thus, the reverse predicate posting list entries enable backward walks in the graph in addition to forward walks. In some implementations, the reverse posting lists of triple 300 represent the entries for reverse triple 300'. The reverse triple 300' may also have its own index entries, as shown in FIG. 4A by the has actor posting list and the Tom Hanks object posting list. As demonstrated in FIG. 4A, in some implementations, the posting lists may be divided into "subject posting lists" and "object posting lists." However, in some implementations, the triples where, for example, Tom Hanks appears as a subject may be stored in the same posting list as the triples where Tom Hanks appears as an object. FIG. 4A demonstrates how a single triple may contribute six entries into the index 155.

Also as depicted in FIG. 4A, each posting list value 405 may have one or more intersection identifiers 410. For example, the subject posting list for <Tom Hanks> depicts two intersection identifiers, acted in and has profession. Of course, only two intersection identifiers are depicted for the sake of brevity and each posting list may have any number of intersection identifiers, depending on the number of edges that lead out of the entity in the graph. Similarly, for the <Acted In> posting list, the number of intersection identifiers may be determined based on the number of entities the relationship connects. Furthermore, each intersection identifier 410 may have one or more associated result identifiers 415. For example, in the <Acted In> posting list, the first intersection value, Tom Hanks, has two associated result identifiers, while the intersection value Meg Ryan has only one. Of course, each intersection identifier 410 may have any number of result identifiers 415.

FIG. 4A also demonstrates that a forward posting list entry corresponding to a subject of a triple may have the predicate 310 as the intersection identifier 410, and the object 315 as the result value 415, a forward posting list corresponding to predicate 310, or a relationship, may have the subject 305 of the triple as the intersection identifier 410 and the object 315 of the triple as a result identifier, and a forward posting list entry corresponding to an object of a triple may have the predicate 310 as the intersection identifier 410 and the subject 305 as the result identifier 415. In some implementations, the intersection identifier 410, or first dimension, is the dimension on which the posting list is sorted by and, therefore, may participate in intersections. The second dimension, or the result identifier 415, may represent items or entities that can be retrieved given the first dimension. In some implementations, the result identifiers 415 may not be used in intersections. A result identifier 415 may also be a pair with a context, such as <result value, context>, where the context encodes additional information about the triple. For example, the posting list for the subject Meg Ryan in the triple {Meg Ryan, "has child", Daisy True Ryan} may include a result identifier 415 of the form: (Daisy True Ryan, female), where the context indicates the child is a female. The context may also encode scoring information relevant to ranking query results or other information that can be used to process queries.

In addition to triple posting lists 400, index 155 may also contain entries for pre-computed graph walks, such as chain-path posting lists 430 and converge-path posting lists 460. A chain path involves intersecting the result identifiers for a first entity with the intersection identifiers of a second entity to obtain the resulting result identifiers. For example, a chain path may be represented by the path X acted_in→Y rated→Z, where acted_in and rated are predicates and x, y, and z are entities. The corresponding pre-computed intersection may be stored in the index under a posting list for acted_in→rated having the two dimensional entries in the form of {x, z}. For example, using the graph of FIG. 2, a pre-computed chain path for acted_in→rated may have an intersection identifier for Tom Hanks and result identifiers of PG and PG-13. This can be seen by walking the graph of FIG. 2 starting with Tom Hanks and first following the relationship acted_in and then, from the next nodes, following the relationship rated. In other words, the movies that Tom Hanks acted in are intersected with the rated posing list. The result of the intersection is ratings, which are the results values in the rated posting list. A posting list for a chain path may have the format of chain-path posting list 430 of FIG. 4A.

A converge path involves an intersection of the intersection identifiers 410 for two or more predicate terms. For example, a converge path may represent actors who are also singers. Such a path may be represented by an entity that has both an in-bound sung by relationship and an in-bound has actor relationship, or by an entity with a reverse has profession relationship with the entities Actor and Singer. As discussed above, the reverse has profession relationship may be created at indexing time by the indexing system. For example, using the graph of FIG. 2, the entity Rita Wilson has a reverse has profession relationship with the entities Actor and Singer. Thus, the indexing system may include Rita Wilson as an intersection value 410 in a posting list for the converge-path posting list of <Actor, Singer>, as shown in converge-path posting lists 460 of FIG. 4A. In general, a converge path may exist when the same intersection identifier appears in the posting list of two or more predicates. In some implementations, unlike triple posting lists 400 and chain-path posting lists 430 in index 155, a converge-path posting list 460 may have only intersection identifiers for the posting list value and may not store result identifiers associated with the intersection identifiers. This is because the result identifiers from the intersection (e.g., the entities of Actor and Singer) are irrelevant, so there is no need to store them and dropping them saves space.

FIG. 4B illustrates posting lists used in some implementations, to facilitate range queries. Range query posting lists may include object-rank posting lists 470, object map 475, bucket posting lists 480, and proximity posting lists 490. The object-rank posting lists 470 may be created for some of the predicates in the data graph. For example some predicates may be identified as filterable predicates by an attribute or inclusion in a list of filterable predicates. Filterable predicates have object values that can be sorted and ordered by a comparator. For example, birth date may be considered a filterable predicate, as can star rating (e.g., the number of stars a movie, restaurant, hotel, etc. has received), etc. Object-rank posting lists 470 have the predicate as a posting list value, the subject of the tuple as the intersection identifier, and the object of the tuple as the result identifier. In addition, the object-rank posting lists 470 can include a context for each result identifier. The context represents the rank of the object value within all object values of the predicate in the data graph. For example, at indexing time the indexer may sort the triples for the filterable predicate by object and assign ranks to the triples based on the rank of the object for a particular triple. Thus, each triple receives a rank based on the value of its object. Multiple triples with the same object value will have the same rank. For example, as illustrated in FIG. 4B, Meg Ryan and George Clooney, both born in 1961, have the same rank of 1250. The object-rank posting lists 470 can be included in the index 155 in addition to the triple posting lists 400.

In addition to the object-rank posting lists 470, the index 155 may also include an object map 475. The object map 475 represents the sorted list of object values for a particular filterable predicate. In some implementations, the sorted list may be a prefix-encoded data array supporting random access so that a binary search may be performed on the object map 475. For example, as shown in FIG. 4B, the object map 475 may encode each object for a filterable predicate as the number of prefix characters the object shares with the previous object, the number of suffix characters that differ from the previous object, and the suffix characters. The first entry will thus be (0, <length of object>, <object>). In some implementations, to enable random access to the object map 475, the object map will include periodic restarts, so that the entry looks like a first entry. In such implementations, the index may include a table that tracks the restart offsets. The object map 475 may be used to convert a range from a query to the corresponding start and end ranks. The object map 475 and the object-rank posting lists 470 may be used to respond to range queries. However, using the object-rank posting lists 470 and object map 475 alone can require a full traversal of the posting list for the filterable predicate to arrive at an answer.

To more efficiently process range queries, in some implementations, index 155 may also include bucket posting lists 480. Bucket posting lists 480 address the seemingly conflicting goals of sorting the posting list on object value to efficiently process range queries and sorting the posting lists by subject entity to make intersections efficient via consistent sort order across all posting lists. To achieve both goals, the object-rank posting lists 470 may be grouped into buckets based on object value or on rank of the object value. Within each bucket, the entries are sorted by intersection id. In some implementations, bucket posting lists 480 contain only intersection identifiers because the system can assume the rank falls within the range represented by the bucket. The buckets can be formed at several granularities to cater to a variety of range spans. For example, one set of buckets for the born in predicate may include a hundred ranks, which would roughly but not necessarily equal a hundred years, and another set of buckets may include ten ranks, etc. Thus, each filterable predicate may have more than one set of buckets, each set having a different granularity. To produce the buckets, at indexing time the indexer may divide the object values uniformly to avoid skew. The division may be based on rank, so that each bucket contains approximately the same number of rank values. For example, the number of people born 100 A.D to 1000 A.D. may be far fewer in the data graph than the number of people born 1900 A.D. to 2000 A.D. Thus, if the bucket size is 100, the bucket that includes 100 A.D. to 1000 A.D. may span a few buckets while it may take 10 buckets to cover the span from 1900 A.D. to 2000 A.D. The system may track the start_rank and end_rank or start_object_value or end_object_value for each bucket. As explained above, the size of a bucket may be varied to cover ranges of varying granularity. For example, one set of buckets may have 1,000 ranks (or object values) per bucket and another set of buckets can have 100,000 ranks per bucket.

For example, as illustrated in FIG. 4B, the bucket posting list 480 for the born in predicate may have a size of 10, so that the buckets that hold approximately ten years worth of birth years. Of course, the first bucket may include a larger range of birth years because of the smaller number of people that exist in the data graph born in that time frame. Because the bucket posting lists 480 may include only intersection identifiers, at query time the bucket posting lists 480 that fall within the range specified by the query may be intersected with the object-rank posting lists 470. The intersection results in a much smaller number of result identifiers being fetched than when traversing the entire posting list represented by object-rank posting lists 470 alone. The fewer posting list entries that are traversed, the faster the query response is returned to the user. Thus, the bucket posting lists 480 enable much faster query response times than use of object-rank posting lists 470 or triple posting lists 400 alone. Bucket posting lists 480 also enable random sort orders for a query. Thus, bucketed posting lists may be generated for any value dimension to enable sorting on that dimension.

In some implementations, index 155 may also include proximity posting lists 490. Proximity posting lists 490 help answer range queries dealing with closeness between two entities, for example gas stations with a specified distance of restaurants, births within a specified distance of the start of a war, etc. To determine proximity, entities may be assigned a location within the space. For example, a gas station is in a geographic space, and the geographic space can be divided, for example, into discrete units. The basic discrete unit may represent a square foot, a square yard, a square mile, or some other basic unit. The gas station can be associated with one of the basic units, which represents the location in the geographic space. Similarly, an event, such as a movie release, is in a time space, and the time space can be divided into basic discrete units. The discrete unit for a time space may be a second, a minute, an hour, a day, etc. Thus, the event may be assigned to a basic unit representing a location in the time space.

The discrete units may be grouped into a hierarchy, so that each level of the hierarchy represents a larger unit area. For example, in a geographic space, several square feet may belong to a block, and several blocks may belong to a square mile etc. Likewise, the date/time units may also be organized into a hierarchy so that 60 minutes belong to an hour, 24 hours belong to a day, 365 days belong to a year etc. In some implementations, the division of the space may be represented in a hierarchy tree, and the basic unit may be considered a leaf, and the upper levels of the hierarchy may be considered ancestors of the basic unit. Thus, an entity located at a specific location may have an identifier for the basic unit and may also be associated with one or more ancestors that represent larger and larger areas, such as a block, a square mile, a city etc. A time space may have a similar relationship between the basic unit and ancestors, the ancestors representing days, weeks, months, years, decades, etc.

To create the proximity posting lists 490, the system may add another type of artificial triple for indexing in the form of (entity, proximity_predicate, ancestor_covering the proximity). The subject of this artificial proximity triple is the entity being indexed, the subject entity type being compatible with the space of the proximity predicate. For example, if the proximity_predicate is in a geographic space, the entity type is compatible with a fixed geographic location, such as a business, a tourist site, a home, a landmark, etc. If the proximity_predicate is in a time space, the entity type is compatible with a fixed time, such as an event. The proximity_predicate may represent the range being indexed, such as x_mile_radius, where x is any of a number of ranges, such as 5 mile, 10 mile, 15, mile etc. As another example the proximity_predicate may be within x_years or x_minutes, etc. The object of the artificial proximity triple represents a node in the location hierarchy that represents locations within the range specified by the proximity_predicate from the subject entity. The nodes in the location hierarchy may also be referred to as ancestors and there may be more than one ancestor corresponding to a given proximity_predicate.

For example, if the proximity predicate is 5-mile-radius, the ancestor id of locations that are within a five mile radius of the subject entity are included as objects in the artificial proximity triple. If there are multiple ancestor ids within the five mile radius, the system may generate multiple artificial proximity triples for the subject entity. Additionally, the system may create multiple proximity triples for the same subject entity and different proximity_predicates, such as 10-mile-radius, 50-mile-radius, etc. In some implementations, the artificial proximity triple may include the basic-unit location associated with the entity as a context of each object. For example, as discussed above, the basic-unit location may represent the spot on the globe of a geographical entity or a moment in time for a date/time entity.

When the system builds the index, the proximity posting lists 490 may be generated from the artificial proximity triples. FIG. 4B illustrates an example of proximity posting list entries for the artificial proximity triple (ABC Gas Main St.; 5 Mile Radius; 56). As illustrated in FIG. 4B, the proximity posting lists 490 may include a posting list for the ABC Gas Main St. subject (492), a posting list for the 5-mile-radius predicate (496), and a posting list for the ancestor identifier 56 (498). The predicate posting list 496 includes forward and reverse posting list entries, the entity being the intersection identifier for the forward entries and the ancestor being the intersection identifier for the reverse entries. In some implementations, the result identifiers may include the location of the entity as a context 493. Storing the location as a context allows the system to quickly calculate a pair-wise distance if a query includes a range that does not exactly match one of the proximity predicates. For example, the query may request gas stations within 8 miles of restaurants. The system may use the proximity_predicate of 10-mile-radius and use the location in the context 493 of the result identifiers to calculate an actual distance from a particular restaurant to decide whether to keep or discard a particular gas station, as will be explained below with regard to FIG. 10.

In addition to the posting lists created from the artificial proximity triples, the proximity posting lists 490 may include a posting list for a special predicate that maps an entity to all its ancestor ids from the location hierarchy. This special predicate, illustrated as distance predicate 499 of FIG. 4B, can be used when a query asks for a distance greater than the maximum proximity predicate in the index. For instance, if 100-mile-radius is the largest proximity predicate for which an artificial triple is created, and a query requests national parks within 500 miles of X Brand hotel, the system may use the distance predicate posting list 499 to respond to the query. The distance predicate posting list 499 includes forward and reverse entries. The forward entries of the distance predicate retrieve the ancestor ids for a particular entity. The reverse entries of the distance predicate retrieve the entities for a particular ancestor id. Thus, once the location of a hotel is known, and the ancestor id that includes the 500 mile radius for the hotel is determined, the reverse posting list entries of the distance predicate can be used to determine the entities within that ancestor id. Thus, the proximity posting lists 490 enable distance queries to have very short latency by reducing the number of pair-wise distance calculations performed to identify the parks within 500 miles of a X Brand of hotel. The calculation savings is greatly multiplied if, for example, the query asks for all banks within 2 blocks of a jewelry store.

Figure 5:
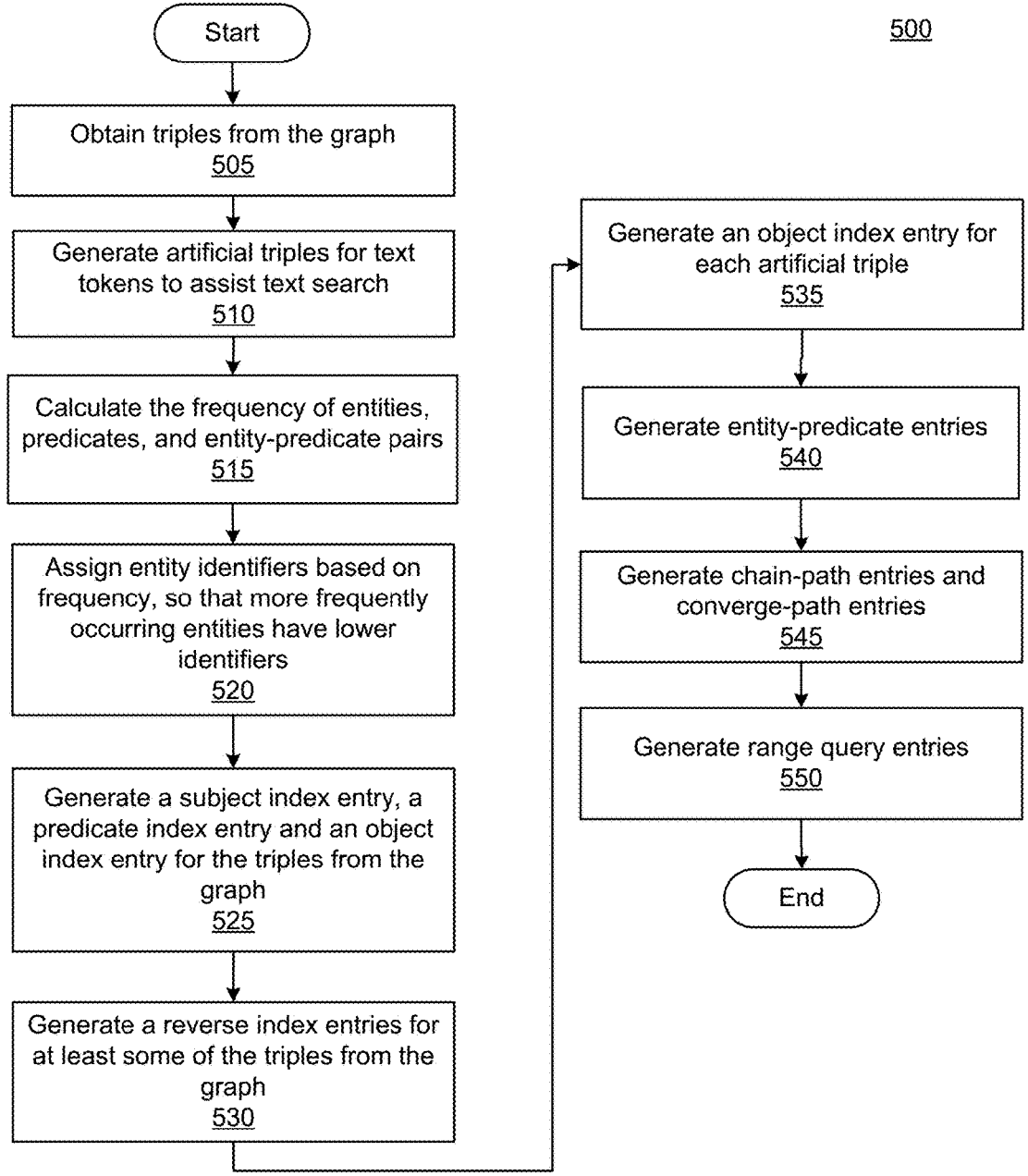
FIG. 5 illustrates a flow diagram of an example of creating posting lists for a data graph, in accordance with some implementations.

FIG. 5 illustrates a flow diagram of an example process 500 for creating posting lists for a data graph, in accordance with some implementations. Process 500 may be performed by an indexing system, such as indexing system 110 of FIG. 1. Process 500 may begin by obtaining triples from the data graph (505). For some triples, the indexing system may generate artificial triples to aid in text searches of the data graph (510). The artificial triples may represent search aids for an entity, thus allowing a text search of the graph. For example, an entity may have a plurality of words that describe the entity and the artificial triples may divide up the words and create posting list entries for single words or multiple word phrases. For example, if one of the entities in the graph is a 50-word biography for the entity Tom Hanks, the artificial triples may include individual words or multiple words from the 50 word biography, with a special predicate, such as has biography word, that indicates the triple is intended for search. Similarly, the triple (Actor, is profession of Tom Hanks) may generate two artificial triples, one with the word 'Tom' and the other with the word 'Hanks', and a predicate that indicates that the terms 'Tom' and 'Hanks' are text search aids for the entity Tom Hanks. The indexing system may generate the artificial triples for at least some of the triples in the graph. In some implementations, this is done for triples where the predicate has an attribute that indicates it is a candidate for text searching. For example, the predicate that links the Tom Hanks entity with its string name or description may be marked as a candidate for text searching, so that the first and last names of actors can be included in the artificial triples.

In some implementations, the indexing system may use a standard tokenizer, such as a tokenizer used for web documents, to tokenize the object for a given (subject, predicate) pair. Thus, the indexing system may create artificial triples, or search triples, with the format of (subject entity, internal_predicate, internal_text_token). For example, the (subject, predicate) pair may be (Tom Hanks, has biography) and the object may be a biography that includes the text "born in 1956 in Concord, Calif. . . . " The indexer may create an artificial tuple with the format of (Tom Hanks, has bio word, "California") and another with (Tom Hanks, has bio word, "1956"). In this example has bio word is a special relationship and '1956' and 'California' are text search aids. In some implementations, the text search aid may be more than one word, or a partial word, such as, for example, 'Concord, California' or 'Calif.'

Further, in some implementations, the indexer may encode a scoring signal in a context paired with the internal_text_token, as explained in more detail above with regard to FIG. 4A. The context may then be used later for scoring text search results. Once the artificial tuples are indexed, a query resolver may use the objects posting lists, or in other words the posting list for <internal_text_token>, to retrieve entities that match a term in the query. Thus, a query requester need not enter a query term that exactly matches a particular entity in the data graph. In some implementations, the internal_predicate and the internal_text_token may include a prefix to ensure they do not collide with entities and predicates that are actually present in the data graph. Further, to optimize space in the index, the indexing system may only keep the object posting lists for the artificial triples because the remaining five posting lists are not useful. The artificial triples may be included in the input stream of triples obtained from the data graph, so that they participate in the remainder of the indexing process. The posting lists generated from the artificial triples may be referred to as search posting lists, because their purpose is to assist in text query processing.

The indexing system may then calculate the frequency of entities and predicates in the body of triples (515). In some implementations, a frequency may also be calculated for each entity-predicate pair. An entity-predicate pair combines the predicate with an entity value. For example, the predicate citizen_of can be combined with the entity United States, to form a predicate that represents only citizens of the United States. The entity-predicate pair may be indexed and used in a converge path, as described below. The calculated frequencies of entities, predicates, and entity-predicate pairs may be used later to decide which pairs should participate in pre-computed paths. In addition, the indexing system may use the calculated frequencies for entities, predicates, and entity-predicate pairs to assign identifiers (520). In some implementations, the indexing system may assign the most frequently occurring entities lower identifiers. This allows more popular entities to be retrieved first in posting list. This also ensures that if a maximum result cutoff is used, the most popular entities are included in the result. Assigning more popular entities a smaller identifier also helps compress the memory used to store the index, giving more frequently appearing entities and relationships a smaller memory footprint. In some implementations, the index may be distributed, and entities and predicates may be assigned an identifier in different naming spaces, with each leaf having its own naming space.

In some implementations, the data graph may include a small number of "types of entities," but a large number of entities for each type. In such implementations, the indexing system may assign a range to each type and entity identifiers may be assigned within the particular range for their type. This enables efficient seeks into a particular type or types in a posting list without having to scan the entire posting list. In other words, when a particular type of entity is desired, the query resolver need only look at intersection identifiers that match the range associated with the type. In some implementations, the indexing system may attach the triples with their corresponding identifiers, so that further indexing activities may deal with triples of identifiers rather than triples of entity or predicate names.

With identifiers assigned, the indexing system may generate subject posting lists, predicate posting lists, and object posting lists for triples in the graph (525). These posting lists may include considered forward entries. A forward subject posting lists entry has the subject of the triple as the posting list value, the predicate of the triple as the intersection identifier, and the object of the triple as a result identifier associated with the intersection identifier for the predicate. A forward predicate posting list entry has the predicate as the posting list value, the subject of the triple as the intersection identifier, and the object of the triple as a result identifier associated with the intersection identifier for the subject. A forward object posting list entry has the object as the posting list value, the predicate as the intersection identifier, and the subject as a result identifier associated with the intersection identifier for the predicate. As indicated above, it is to be understood that the indexing system may use the identifiers associated with a subject, predicate, or object as the posting list value, the intersection identifier, or the result identifier.

In addition, the indexing system may generate one or more reverse posting list entries for at least some of the triples in the graph (530). As discussed above, the indexing system may not generate a reverse entry for artificial triples. Furthermore, in some implementations, the indexing system may use other criteria to determine that some triples do not need reverse posting list entries, to optimize space utilization. For example, some predicates may have an indication that tells the indexer not to create reverse posting list entries for the triple. As an example, the predicate has stock price may include a flag, an attribute, or a relationship that indicates a reverse posting list entry is not needed for triples that include the predicate. Accordingly, the indexing system may only generate reverse posting list entries for certain triples from the graph. As explained above, a reverse subject posting list entry may have the object as the intersection identifier and the predicate as a result identifier associated with the intersection identifier. A reverse predicate posting list entry may have the object as the intersection identifier and the subject as a result list identifier associated with the intersection identifier. A reverse object posting list entry may have the subject as the intersection identifier and the predicate as a result identifier for the intersection identifier. The indexing system may also generate an object posting list for each artificial triple (535). As discussed above, this may be the only useful posting list for these types of triples.

In some implementations, the indexing system may also generate posting lists for entity-predicate pairs (540) because some pre-computed paths may benefit from further filtering. For example, a pre-computed converge path between the predicates acted in and citizen of would not be selected for pre-computation because every actor has a citizenship, so the converge result is as large as the acted in list. However, a converge path of U.S. actors might be helpful. U.S. citizens can be identified by an entity-predicate pair where the predicate is citizen of and the object entity has a value of United States. Accordingly, the indexing system may bind the object to the predicate, creating an entity predicate. Entity predicates may be included in a generated triple. For example, the generated triple may have a value of citizen_of_US as the predicate, a dummy subject, and an identifier of a person with U.S citizenship as the object. Although this example binds an object to a predicate, the indexing system may also bind a subject to the predicate in a similar manner to create an entity predicate. The indexing system may create a reverse posting list entry for the generated triple, so that the object identifiers are intersection identifiers. The posting list entry may not include result identifiers for the intersection identifiers, as they convey no value.

In some implementations, the indexing system may generate pre-computed intersection posting lists (545). For example, at indexing time, triples of frequent predicate terms may be joined with triples of other frequent predicate terms, or entity predicates. The calculated frequency of predicates and of entity-predicate pairs may be used to determine the intersections of large posting lists with other large posting lists. If the result of the intersection of two such large posting lists is small, the intersection may be selected for path pre-computation. A result may be considered small when the result set has significantly fewer entries than the frequency corresponding to the two predicates that are being joined in the path precomputation, so that the cost of storing the results outweighs the cost of computing the full intersection. For example, for popular queries that are requested often, the number of results considered significantly fewer may be higher than the number of results for less popular queries that are not requested often. Pre-computing the result set for these large intersections trades lower latency at query time for slightly more space used in the index. In other words, the indexing system may perform pre-computation for intersections that are cheap to keep and expensive to compute. The index may include two types of pre-computed paths, a chain path and a converge path, as discussed above.

In some implementations, the indexing system may generate range query posting lists (550). For example, at indexing time the system may generate object-rank posting lists, bucket posting lists, an object map, and/or proximity posting lists. The object-rank posting lists, object map, and bucket posting lists may be generated from triples for filterable predicates and may include a ranking of the object value for the triple. The proximity posting lists may be generated from artificial proximity triples generated for entities that occupy a space, such as a geographic or date/time space, and a proximity predicate for the space. Creation of range query posting lists is explained in more detail below with regard to FIGS. 9 and 11. Process 500 may then end. Process 500 may be run for the entire data graph, or may be performed for specific portions of the index on a rolling basis. For example, for implementations where the index is distributed over several servers, each server may perform process 500 for the posting lists that it stores.

Updates to the Index

Because data collections, such as graph-based data store 190, may not be static, the data graph indexing system may be configured to handle real-time updates to support rapidly changing data, such as stock prices, new book publications, or new movie releases. To accommodate real-time updates, the indexing system may determine changes to the graph. Changes may include addition of new triples, deletion of triples, or changing the value of an object for a triple. In some implementations, changes may be handled as deletions followed by insertions, so that an update involves a delete of the old triple followed by an insert of the new triple. The changes may also be referred to as deltas. The indexing system may assign monotonically increasing timestamps to each delta. The deltas may then be passed to an instance manager of the index cluster. Each index cluster may include its own instance manager, such as instance manager 159 of FIG. 1. The instance manager may log the deltas and apply the deltas to the index, one at a time.

For example, to apply a real-time update, the instance manager may convert a set of deltas into a sequence of updates to the posting lists. Each update may be associated with a timestamp and be retried until successfully applied to ensure strict ordering of updates. Updates may be batched into 10s or 1000s of updates. Each index cluster may track the timestamp of the data it is currently serving. If an index cluster fails and restarts, the index cluster may apply an update as long as the update timestamp is greater than the current timestamp of the triple at the index cluster. The current timestamp of the triple may be updated after successful application of an update. If a timestamp of a delta is earlier than the current timestamp, the index cluster may consider the update successfully applied without actually attempting to apply the update.

In an implementation with a distributed index 155, the index cluster 150 may comprise a root computing device, such as a server, and a plurality of leaf computing devices. The root may receive an update for the index and translate it to entity/relationship identifiers to determine which leaf stores the various posting lists that require updating. The root may group updates by leaf and initiate execution of the updates at the respective leaves in parallel. Updates that touch a particular leaf may be executed in serial order, for example using the timestamps as described above, but updates to the various leaves may not be serial, unless a specific posting list is sharded by intersection identifiers. Sharding may occur for very large posting lists, and involves storing some of the intersection identifiers for a particular posting list value on a first leaf while storing the remaining intersection identifiers, and their corresponding result identifiers, on a second leaf. Updates may be specified by name of the posting list to be modified and the operation to be carried out. Operations may include adding an intersection identifier to a posting list, moving one or more result identifiers from a first intersection identifier to a second intersection identifier, replacing a result identifier with a different result identifier, etc.

Pre-Computed Paths

In implementations that use pre-computed paths, real time updates pose an additional burden on real-time index updating. This is because every time a relationship or entity is modified, the change may result in anywhere from a few to hundreds of updates. Because updating each pre-computed path in real-time may be too costly, some implementations may not update pre-computed paths. Instead, the indexing cluster, for example each leaf of a distributed indexing system, may track the changes to an entity-relationship pair since the last build of the index. In some implementations, for at least some of the predicates, the indexing system may track the entity identifiers of subject entities of triples that have been involved in a change since the last index build. As indicated above, a change may include an addition, a deletion, or an update. An index build may be performed as described above with regard to FIG. 5.

If the query resolver determines that a pre-computed path posting list is used to obtain search results, the query resolver may recalculate the path for any entities from the pre-computed path that have been marked as updated. For example each leaf may store a list of identifiers updated for at least some of the predicates, such as updated entities 157 of FIG. 1, and the query resolver may use these identifiers to walk the pre-computed path. These freshly calculated results may be merged with the pre-computed posting lists from the index to obtain updated results. This ensures that the latency is kept low because there is no need to compute the full intersection, just an intersection for entities that have changed.

Figure 6:
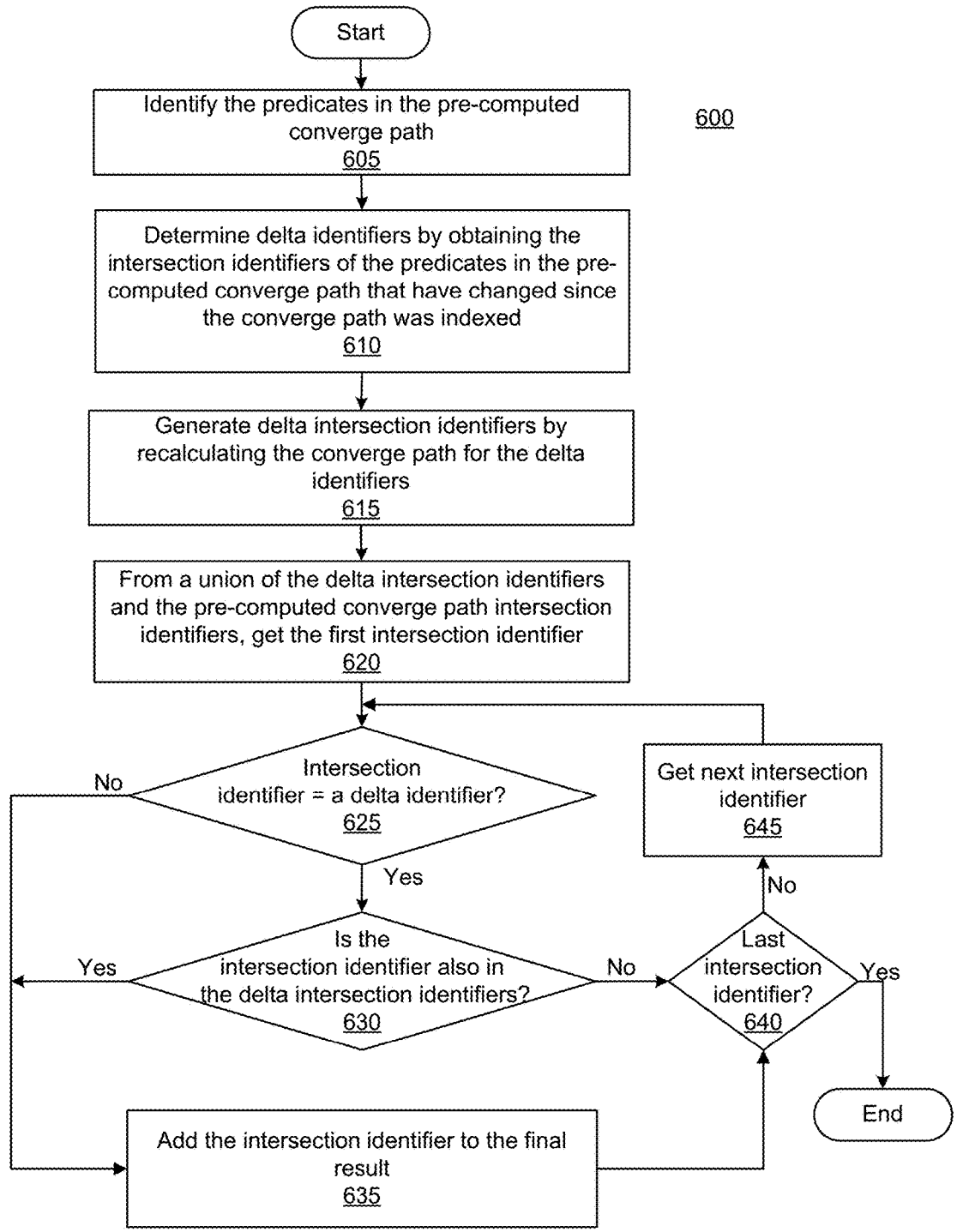
FIG. 6 illustrates a flow diagram of an example of querying data found in a converge path.

FIG. 6 illustrates a flow diagram of an example process 600 for querying data found in a converge path, in accordance with some implementations. Process 600 may be performed by a query resolver, such as query resolver 158 of FIG. 1, once the query resolver has determined that the query pertains to a converge path in the index. For example, the query may have specified the converge path, or the query resolver or search system may have mapped the query to the converge path. Once the converge path has been identified, the query resolver may identify the predicates in the pre-computed converge path (605). The query resolver may then identify intersection identifiers that have changed for the identified predicates since the converge path was last indexed (610). These intersection identifiers may be stored, such as in updated entities 157 of FIG. 1. These intersection identifiers are delta identifiers, or the identifiers that have changed. The delta identifiers may be determined from any of the predicates that make up the converge path. In some implementations, the delta identifiers may be pruned to improve query performance. For example, if the query has a list of intersection identifiers to apply to the converge path, the delta identifiers may be pruned to include only those intersection identifiers.

The query resolver may use the delta identifiers to generate delta intersection identifiers by re-walking the converge path using the delta identifiers as input (615). For example, the query resolver may determine whether a particular delta identifier still exists in the posting lists of the two predicates of the converge path. Although the full converge path is expensive to execute, because the query is run for only a small number of identifiers, the delta identifiers, the expense is greatly reduced. Furthermore, although an example of two predicates is provided, some converge paths may include more than two predicates. In such a situation, the posting lists of all the predicates in the converge path may be consulted to determine the delta intersection identifiers. The delta intersection identifiers may contain the intersection identifiers that exist in each of these predicates' posting list.

The query resolver may then generate a union of the delta intersection identifiers and the intersection identifiers of pre-computed converge path entries obtained from the index. The union may be used as input to a loop that generates an updated converge path. For example, the query resolver may perform a union of the two lists of intersection identifiers, keeping track of which records came from the delta intersection identifiers and which came from the index (620). The union may be a merged list or a concatenation of the two lists. The query resolver may obtain the first intersection identifier from the union of the two sets of entries and determine whether the intersection identifier is one of the delta identifiers (625). If the intersection identifier is not one of the delta identifiers (625, No), the entry must have come from the indexed converge path and has not been updated. Therefore, the query resolver may add the entry to the final result (635). If the intersection identifier is one of the delta identifiers (625, Yes), the query resolver may determine whether the delta result includes an entry for the intersection identifier (630). If so (630, Yes), the entry from the delta result may be added to the final result (635). If the delta result does not include a corresponding entry for the intersection identifier (630, No), then the entry pertaining to the identifier has been deleted, so the identifier is skipped and not added to the final result. If there are additional intersection identifiers in the union (640, No), the next intersection identifier is obtained (645) and steps 625-640 are repeated for the next identifier. The final results may include all identifiers from the delta result and any identifiers from the converge path that are not delta identifiers. When no additional intersection identifiers remain (640, Yes), process 600 ends, having generated an updated result for the converge path. In other words, the query resolver may pass the final result to the search system to be used, as appropriate, in generating the search results. The final result for a converge path may contain only intersection identifiers, as explained above with regard to FIG. 4A.

Figure 7:
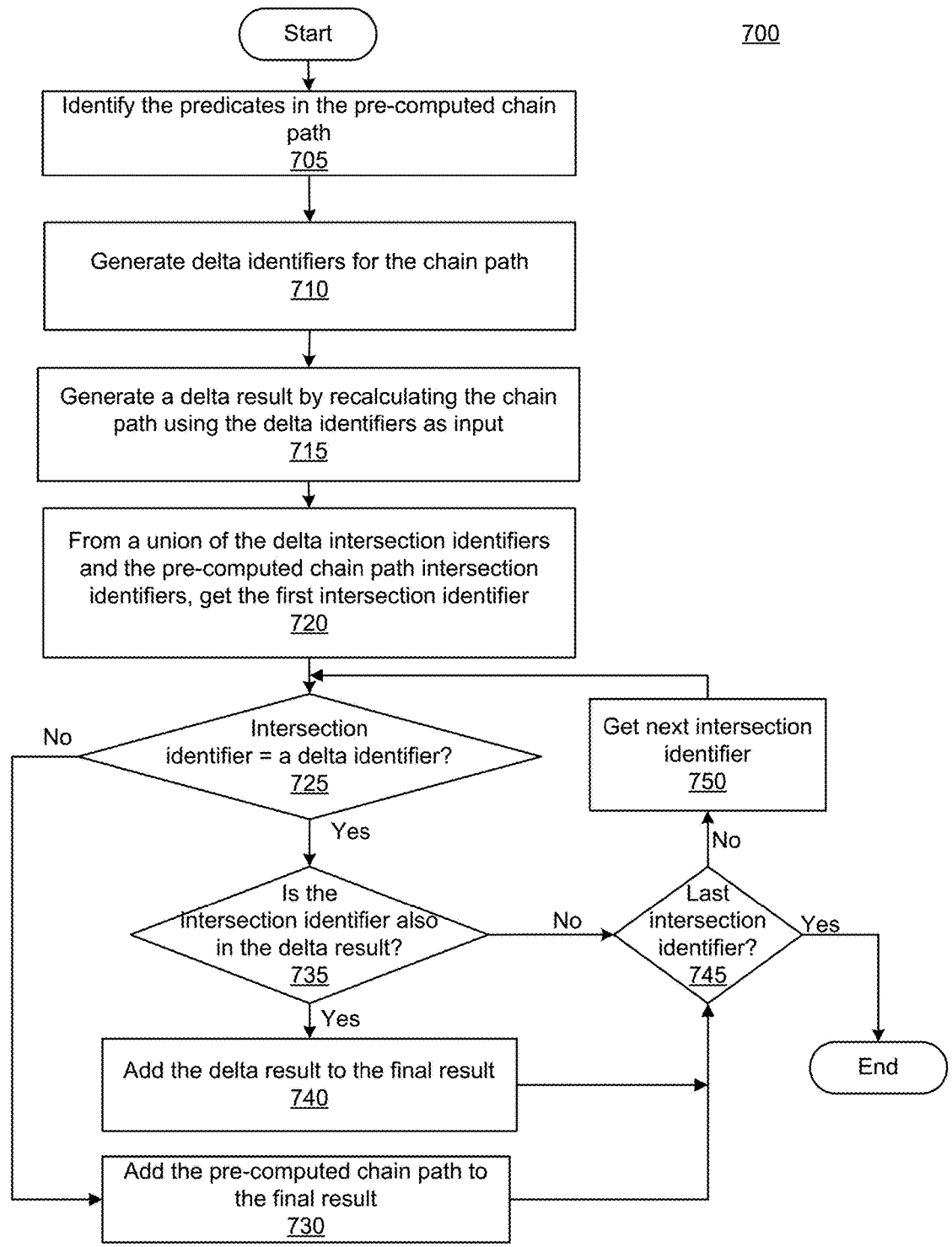
FIG. 7 illustrates a flow diagram of an example of querying data found in a chain path.

FIG. 7 illustrates a flow diagram of an example process 700 for querying data found in a chain path, in accordance with some implementations. Process 700 may be performed by a query resolver, such as query resolver 158 of FIG. 1, once the query resolver has determined that the query pertains to a chain path in the index. For example, the query may have specified the chain path, or the query resolver or search system may map the query to the chain path. Once the chain path has been identified, the query resolver may identify the predicates involved in the pre-computed chain path (705). The query resolver may then identify delta identifiers for the chain path (710). As explained above, intersection identifiers that have been added, deleted, or modified may be stored by predicate, such as in updated entities 157 of FIG. 1. The query resolver may identify the intersection identifiers that have changed for the first predicate in the chain as delta identifiers. For example, in a chain path of xAyBz, where x, y, and z are entities and A and B are predicates, if the tuple (x, A, y) is changed (e.g., added, deleted, modified), then x is identified as a delta identifier, because it is in the list of modified identifiers for A. In the same example, if tuple (y, B, z) has changed, the query resolver may also identify x as a delta identifier. This is because the first tuple in the chain, (x, A, y) has y as a result. Thus, if the next hop in the path has changed, we need to re-walk the path starting the first entity, or entity x, to determine whether x→z is still a valid path.

Figure 8:
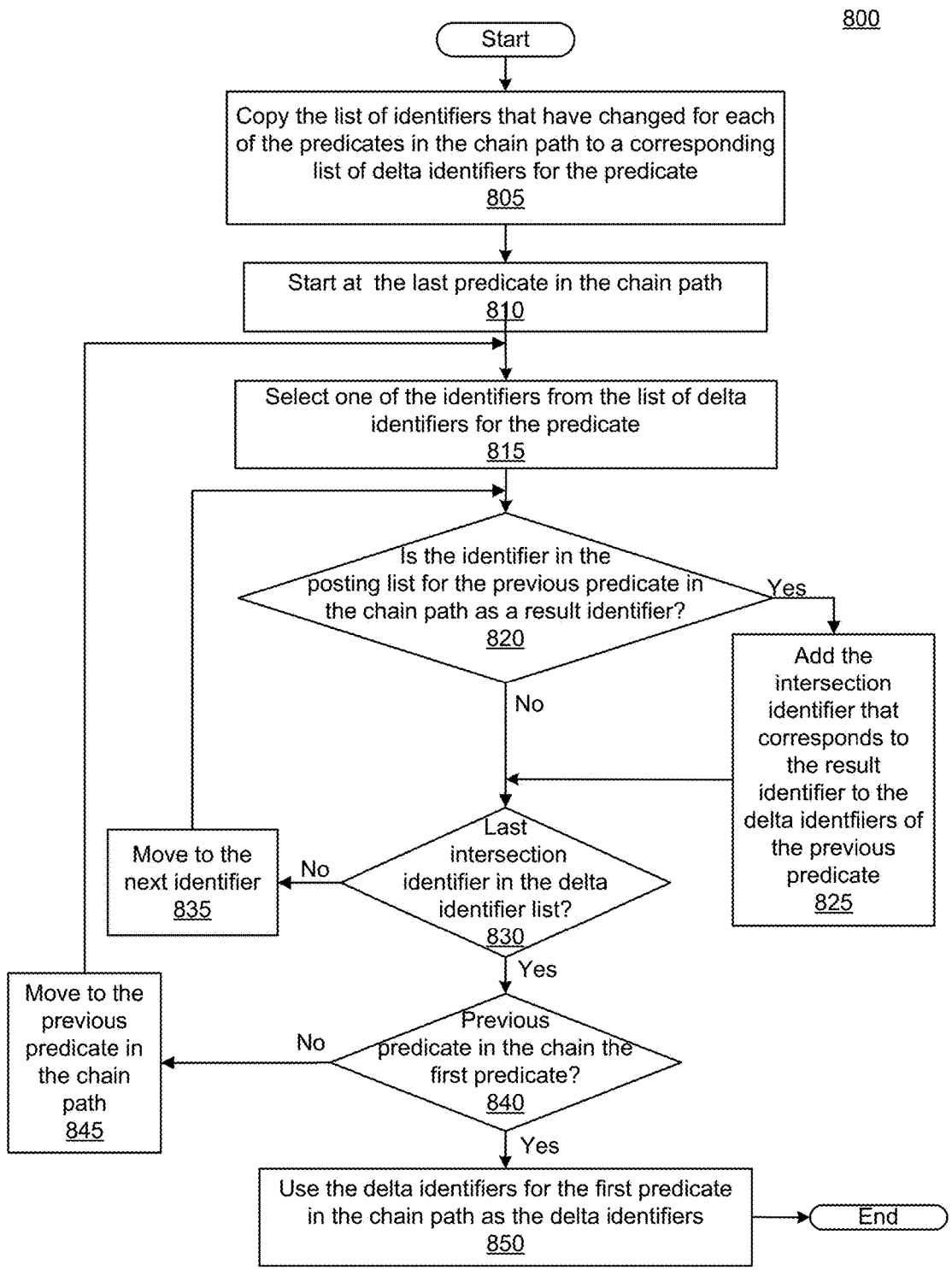
FIG. 8 illustrates a flow diagram of an example of identifying delta identifiers for re-computing a chain path.

FIG. 8 illustrates a flow diagram of an example process 800 for identifying delta identifiers for a chain path. The query resolver may perform process 800 as part of step 710 of FIG. 7. For example, the query resolver may copy the list of identifiers that have changed for each predicate in the chain path to a corresponding list of delta identifiers (805). This allows the query resolver to have a list of identifiers for the predicates that have changed since the chain path was indexed that the query resolver can modify. The query path resolver starts with the list for the last predicate in the chain path (810) and work through the identifiers in its delta list. For each identifier in the delta list, the query resolver may determine whether the identifier appears as a result identifier in the posting list for the previous predicate in the chain path (820). If the identifier is a result identifier (820, Yes), then the query resolver may add the intersection identifier that corresponds to the result identifier to the delta list for the previous predicate. In other words, if the tuple (y, B, z) has changed, the query resolver will find y as a result identifier for x in the posting list of predicate A. Accordingly, the query resolver will add x to the delta identifiers for predicate A (825). At this point the delta list for predicate A and the list of identifiers that have changed as stored, for example, in updated entities 157, may differ because x may not have previously existed in the list for predicate A.

If other intersection identifiers exist in the delta list for the predicate (830, No), the query resolver repeats steps 820 to 830 for the next identifier. When each identifier in the delta list has been inspected, the query resolver determines whether another predicate exists in the path (840). If the previous predicate is not the first predicate (840, No), the query resolver inspects the delta posting list for the previous predicate, by repeating steps 815 to 840 for the previous predicate. If the previous predicate is the first predicate in the chain path (840, Yes), the query resolver can use the delta list for the first predicate as the delta identifiers for the chain path (845). In some implementations, the delta identifiers may be pruned to improve query performance. For example, if the query has a list of intersection identifiers to apply to the chain path, the delta identifiers may be pruned to include only those intersection identifiers.

In some implementations, the query resolver may perform step 820 using a reverse posting list entries. The reverse posting list entries may also be referred to as the posting list for the reverse of the predicate. For example, using the example above, !A may represent the reverse predicate of A and may have posting list entries. As explained above, the reverse posting list entries swap the subject and object for a predicate, so that the subject (or x from the example) becomes the object and the object (or y from the example) becomes the subject. Thus, in a posting list for !A, y is an intersection identifier and x becomes a result identifier for y. Because y is an intersection identifier it can efficiently be intersected with the delta identifiers for predicate B, resulting in a list of result identifiers can be added to the delta identifiers for predicate A. Using the reverse posting list entries allows the query resolver to quickly locate specific posting list entries as opposed to walking the entire posting list of a predicate.

Returning to FIG. 7, with delta identifiers determined the query resolver may use the delta identifiers to generate a delta result by re-walking the chain path query using the delta identifiers as input (715). For example, the query resolver may intersect the intersection identifiers from the posting list for A with the delta identifiers. For any matches, the query resolver may intersect the result identifiers, e.g., the result identifiers for x with the intersection identifiers of the posting list B. For any matches found, the query resolver may associate the result identifiers from B's posting list with the corresponding intersection identifiers from the posting list for A. The associations, for example x→z, are the delta result for the chain path. Thus, the delta result may have intersection identifiers (e.g., x) and result identifiers (e.g., z) Again, although computing the full chain path is expensive to execute, because the path is calculated for only the delta identifiers, the expense is greatly reduced. Furthermore, although an example of two predicates is provided above, some chain paths may include more than two predicates. In such a situation, the intersection of result identifiers of one predicate with the intersection identifiers of the next predicate may be used to determine the delta result. The delta result itself may contain the intersection identifier of the first predicate (x in the example) paired with the result identifiers of the final predicate (z in the example). An intersection identifier of the delta result is a delta intersection identifier. In some implementations, the delta result may be pruned to improve query performance. For example, the query may have a list of result identifiers that are relevant and the query resolver may keep only records in the delta result that correspond to the result identifiers that are relevant.

The query resolver may then use the delta intersection identifiers and the intersection identifiers of the pre-computed chain-path entries obtained from the index as input to a loop that merges the delta result and the chain-path entries. For example, the query resolver may perform a union of the two lists of identifiers, keeping track of which records came from the delta identifiers and which came from the indexed chain path (720). The union may be a merged list or a concatenation of the two lists. The query resolver may obtain the first intersection identifier from the union of the two intersection identifier lists and determine whether the intersection identifier is one of the delta identifiers (725). If the intersection identifier is not one of the delta identifiers (725, No), the entry must have come from a pre-computed chain path entry that has not been updated. Therefore, the query resolver may add the entry to the final result (730). If the intersection identifier is one of the delta identifiers (725, Yes), the query resolver may determine whether the intersection identifiers in the delta result include the intersection identifier (735). If so (735, Yes), the entry from the delta result may be added to the final result (740). If the delta result does not include a corresponding entry for the intersection identifier (735, No), then the entry pertaining to the identifier has been deleted, so the entry is skipped and not added to the final result. If there are additional intersection identifiers in the union (745, No), the next intersection identifier is obtained (750) and steps 725-745 are repeated for the next identifier. The final results may include all pairs from the delta result and any pairs from the chain path that do not include a delta identifier. When no additional intersection identifiers remain (745, Yes), process 700 ends, having generated an updated result for the chain path. As with a converge path, the query resolver may pass the final result to the search system to be used in determining search results. The final result may contain intersection identifiers and associated result identifiers, as explained above with regard to FIG. 4A.

Range Queries

Figure 9:
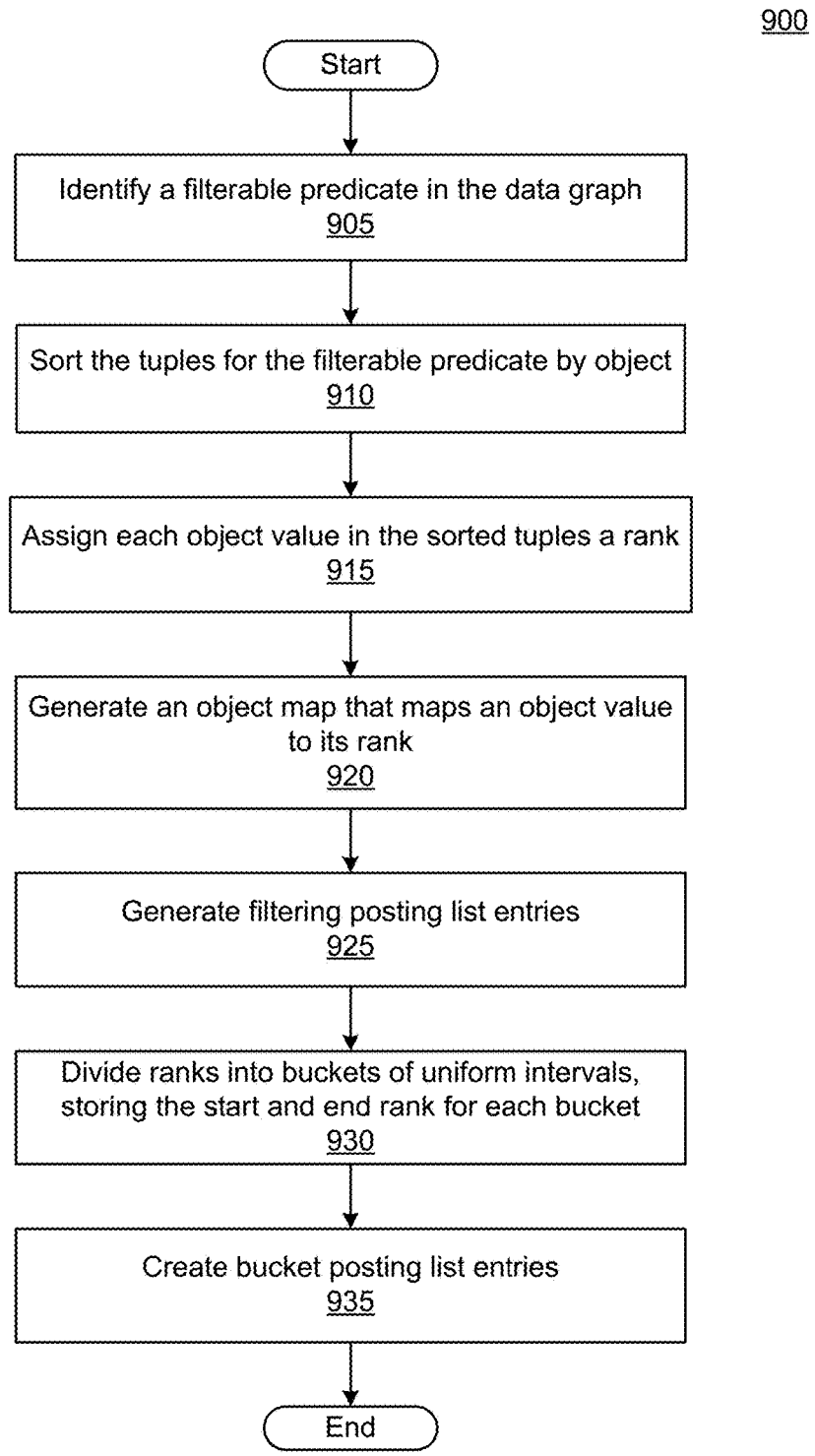
FIG. 9 illustrates a flow diagram of an example process for generating range-query index posting lists for an index of a data graph.

FIG. 9 illustrates a flow diagram of an example process 900 for generating range-query posting lists for an index of a data graph, according to some implementations. An indexer may perform process 900 as part of step 550 of FIG. 5. Process 900 may begin with the system identifying a filterable predicate in the data graph (905). Such predicates may be identified as filterable by an attribute or membership in a list, or by some other method of identifying predicates that have objects with values that can be ordered by a comparator. Once a filterable predicate is identified, the system may sort the triples for the predicate by object value (910). The system may then assign each unique object value a rank (915). In other words, multiple triples mapping to the same object value will have the same rank. Ranks may be assigned based on all or part of the object value. For example, the same rank may be assigned to each day, to each month, or to each year of a date depending on the need. For instance, for triples that represent log records, a different rank may be assigned to each hour but for triples that represent birthdates, a different rank may be assigned to each year. Thus, the system may flexibly assign ranks to object values. The level of granularity for the rank may be a setting provided by a system administrator. After assigning a rank to each object value, the system may store a mapping of object value to rank in an object map (920). The object map allows the system at query time to convert a range from the query, for example "between 1975 and 1985", to start and end ranks for the predicate. In some distributed index implementations the rank may be a local rank for the particular leaf node, and each leaf node may have an object map. In addition to generating an object map, the system may also generate object-rank posting lists (925). The object-rank posting lists may be constructed in addition to the predicate posting list for the triple. The object-rank posting list may include the rank of the object as a context for the object, i.e. the result identifier. The object-rank posting list 470 of FIG. 4B illustrates an example of a object-rank posting list.

The system may then divide the ranks into buckets of uniform intervals, storing the start and end rank for each bucket (930). In some implementations, the system may have various levels of granularity. For example, one set of buckets may have an interval of 10 ranks, another set of buckets may have an interval of 100 ranks, while third set of buckets has an interval of 1500 ranks or 10000 ranks. These intervals are provided as an example only and implementations may cover any level of granularity. The system may then generate bucket posting list (935). Bucket posting lists may include the subject of the triples as intersection identifiers, because the bucket implies a range for the objects within the bucket. The posting list value may identify the predicate by a bucket identifier, which may be a number or an alphanumeric identifier. In some implementations, the start and end rank for the bucket may be included as part of the posting list value. In some implementations, the system may store a bucket map that maps the start and end rank for each bucket to the bucket identifier. In some implementations the actual object values may be stored instead of the rank. Bucket posting list 480 of FIG. 4B illustrates an example of a bucket posting list. It will be understood that to generate buckets of varying granularity, in some implementations, the system may perform steps 930 and 935 multiple times for a single filterable predicate, using a different interval for the rank. Process 900 then ends for the filterable predicate. The system may perform process 900 for any number of filterable predicates, although in some implementations, only predicates likely to be part of a range query may be selected for process 900. As indicated above, a system administrator may indicate some of the predicates are filterable predicates eligible for process 900. As triples are added to the data graph, entries in the bucket posting lists and object-rank posting lists may be added, deleted, or modified as needed as part of the indexing process. In some implementations, if an object value of a new triple does not already have an assigned rank, the system may delete the bucket posting lists and object-rank posting lists for the predicate and re-create the posting lists to include the new rank(s).

Figure 10:
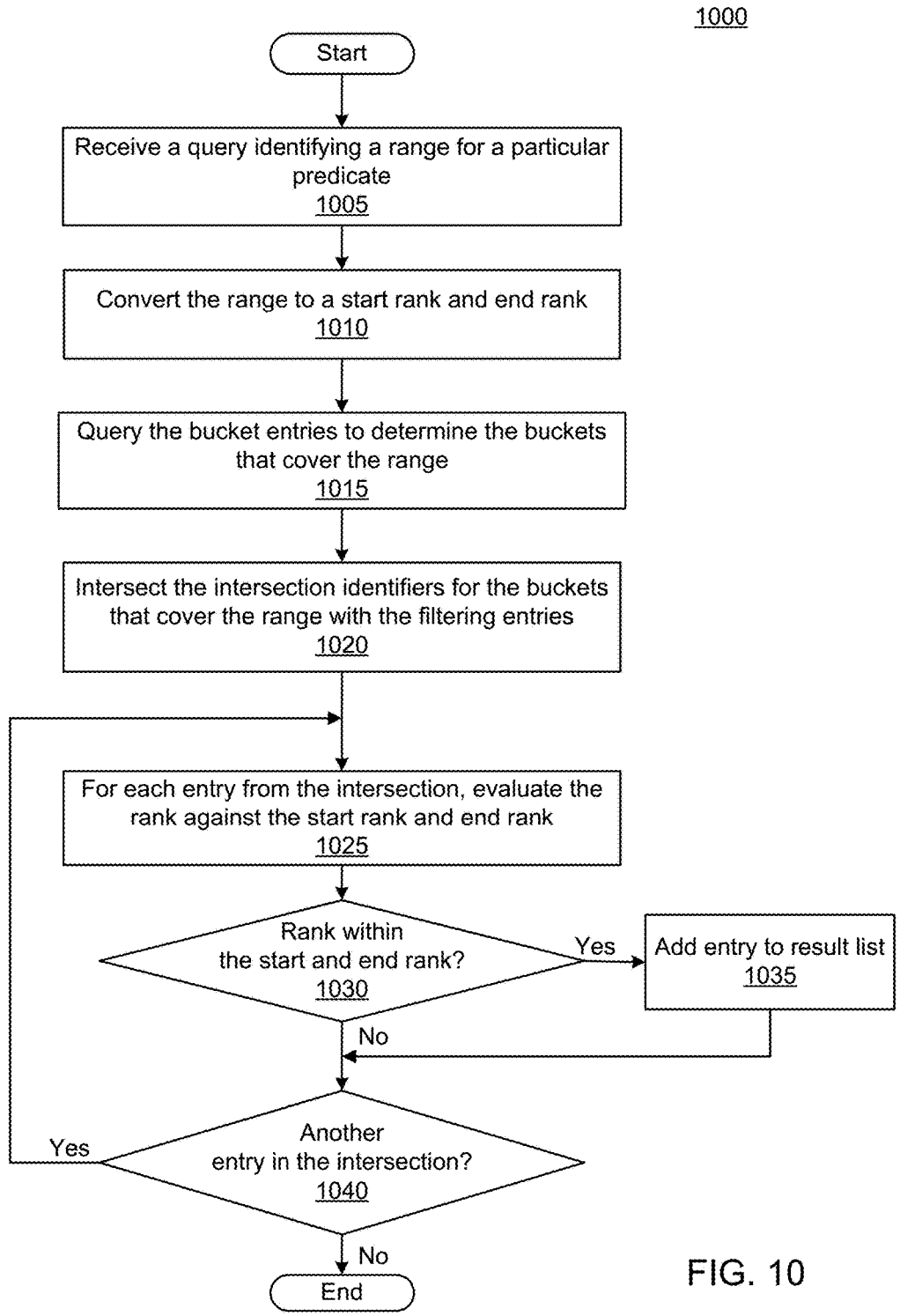
FIG. 10 illustrates a flow diagram of an example process for using range-query index posting lists.

FIG. 10 illustrates a flow diagram of an example process 1000 for using range-query posting lists. A query resolver may perform process 1000 when it receives a query that includes a range for a particular filterable predicate (1005). The system may convert the range in the query to a start rank and an end rank using the object map (1010). The system may then query the bucket posting list for the predicate to determine which buckets include ranks within the query start rank and end rank (1015). If the index includes multiple sets of buckets of varying granularity, the system may look at the range to determine which set of buckets most closely matches the range to minimize the number of buckets selected. Once the set of buckets is selected, the system may determine which buckets in the set include entries with ranks within the query start rank and end rank. For example, if the start rank for a bucket is less than or equal to the end rank of the query, the bucket includes ranks within the query range. Similarly, if the bucket end rank is greater than or equal to the query start rank, the bucket includes ranks within the query range. The buckets that are included within the query range are intersected with the object-rank posting list of the predicate (1020). The intersection allows the system to determine the actual rank of each triple to determine which triples from the buckets are included in the result. Without using the bucket posting lists, the system has to look at each entry in the object-rank posting list for the predicate. Using the buckets makes the number of result identifiers fetched much smaller than traversing the entire object-rank posting list, resulting in much faster query response time.

Thus, for each intersection identifier from the intersection, the system may fetch the result identifiers, which include the rank as the context (1025). If the rank of a result identifier is within the query start rank and end rank (1030, Yes), the intersection identifier and result identifier (e.g., the triple) is added to the result list (1035). If not (1030, No), the next intersection identifier/result identifier pair is evaluated (1040, Yes) until no entries remain in the intersection (1040, No). Process 1000 then ends, having determined a result for the range query. The results may be used in further query steps or formatted for display to the query requester.

The system may include the ability to respond to a special kind of range query, also referred to as an interesting statistics query. These queries ask for interesting statistics on some group of entities, such as US presidents, 1950s Actors, or fortune 500 stocks. In some implementations the query may also specify a filterable predicate to use in generating the statistics. The result for such queries is a histogram corresponding to each filterable predicate that is relevant for the group of entities or, if one or more predicates are specified, for each specified predicate. For example, the birth years and heights of US presidents may be returned for a query asking for interesting statistics for US presidents. The object-rank and bucket posting lists may assist in the creation of the histograms for such queries. For example, after determining the entities in the group, the system may intersect the entities with the object-rank posting lists to obtain the result identifiers for the group of entities. The result identifiers may be aggregated and the system may construct a histogram from the values associated with the result identifiers, or from the rank in the context for the result identifiers. In a distributed index, the root may construct the histogram from aggregated results sent by the leaf nodes.

In some implementations, the interesting statistics query may specify that the interesting statistics are generated for objects of the predicate, for subjects of the predicate, or for both. For example, if the query specifies object statistics are specified, the query resolver may aggregate the object values in the predicate posting list. If subject statistics are specified, the subject values for the predicate may be aggregated. If the query specifies all statistics, the query resolver may generate two histograms for the predicate, one aggregating the subjects and the other aggregating the object values.

Figure 11:
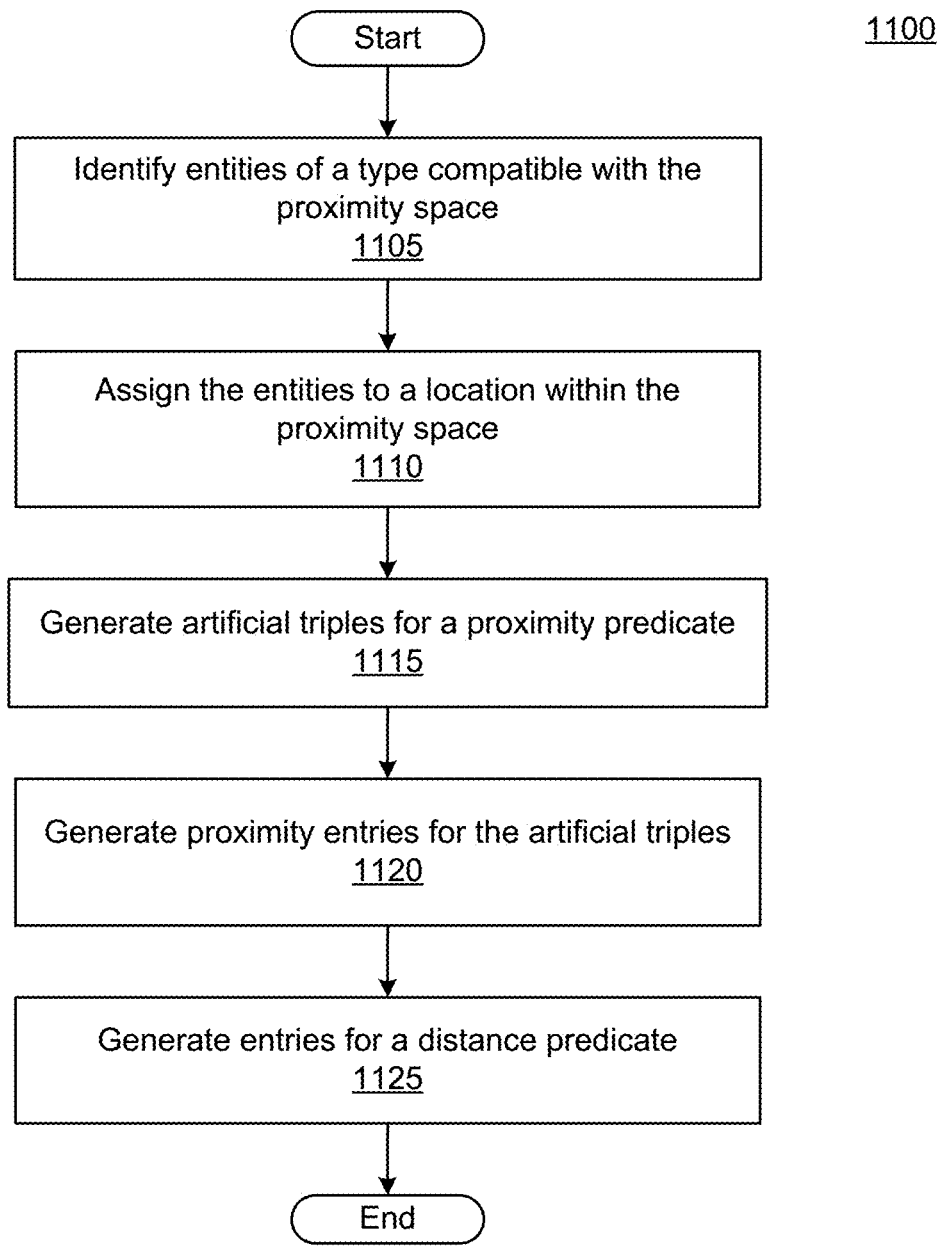
FIG. 11 illustrates a flow diagram of an example process for generating proximity-query index posting lists for an index of a data graph.

FIG. 11 illustrates a flow diagram of an example process for generating proximity-query posting lists for an index of a data graph. Proximity queries represent a special kind of range query, where the range is specified as a proximity with regard to some other value, rather than a beginning and ending value. Process 1100 may be performed at indexing time by an indexer. Proximities operate in a space, such as a geographic space, a date space, a time space, etc., and only entities of a type compatible with the space are eligible to be included in the proximity lists. Thus, the indexer may identify the entities in the data graph that are of a type compatible with the proximity space (1105). For example, if the proximity space is a geographic space, only entities that occupy a fixed location in the geographic space may be compatible. For instance, buildings, national parks, etc. may be entities compatible with a geographic space. As other examples, log records, which are associated with a fixed time, may be compatible with a time space, and events, such as birth dates, movie release dates, may be compatible with a date space. For the identified entities, the indexer may determine a location within the proximity space for each entity (1110). For example, the time associated with a log record may be the location of the log record. A building may be assigned to a unit that represents an area on the globe. In some implementations, the assignment may be part of the data graph, for example an attribute of an entity or an entity linked to the entity through some relationship. In some implementations, the location may be part of a location hierarchy, with the internal nodes of the hierarchy representing larger collections of the basic unit for the space. For example, the basic unit that represents the area of the globe may be grouped with 9 other basic units to form an ancestor node that represents an area covered by the 10 basic units. Similarly, the ancestor node might itself have a second level ancestor node that represents an area covering 10 of the first level ancestor nodes, or an area covered by 100 basic units. The entity thus may be associated with a location and one or more ancestors of the location in a hierarchy tree.

The indexer may generate artificial triples for one or more proximity predicates (1115). A proximity predicate is an artificial predicate that does not exist in the data graph, but that specifies a proximity range. Examples of proximity predicates are 10-mile-radius, within 75 seconds, within 3 years, etc. The subject for the artificial triple is the entity from the data graph that was identified as compatible with the proximity space. The object of the artificial triple is an ancestor that falls within the proximity predicate. For example, if the proximity predicate is 5-mile-radius and the entity is a gas station, the object of the triple would be an ancestor node that falls within 5 miles of the gas station. Each subject of a proximity predicate may have many ancestors that fall within the proximity predicate, so the indexer may generate many artificial triples for the gas station/proximity predicate pair, depending on the range represented by the proximity predicate. The indexer may also generate artificial proximity triples for a number of proximity predicates representing various levels of granularity. For example, the indexer may generate triples for 5-mile-radius, 10-mile-radius, 50-mile-radius and 100-mile-radius for example. The proximity predicates may be assigned identifiers that will not conflict with identifiers assigned to predicates that exist in the data graph.

The indexer may then generate proximity posting lists in the index for the artificial triples (1120). The proximity posting lists may be generated as discussed above with regard to step 525 of FIG. 5, so that a subject posting list, a predicate posting list, and an object posting list may be generated or updated for each artificial proximity triple. An example of the three types of proximity posting lists are illustrated in proximity posting lists 490 of FIG. 4B. When generating the proximity posting lists, in some implementations, the indexer may include the basic unit location of the entity as a context of the result identifier, as illustrated in FIG. 4B. The location allows the system to perform finer filtering more efficiently at query time.

In addition to the proximity posting lists for the artificial triples generated from proximity predicates, the indexer may also generate a posting list for a distance predicate (1125). The forward posting list entries for the distance predicate maps an entity to all its ancestors. The reverse posting list entries for the distance predicate maps each ancestor to the entities located within the area represented by the ancestor. Posting list 499 of FIG. 4B illustrates an example of a posting list for a distance predicate. With forward and reverse posting lists generated for the artificial triples, and the special distance predicate, the indexer may complete process 1100 for the particular proximity space. Of course the indexer may perform process 1100 for another proximity space.

Figure 12:
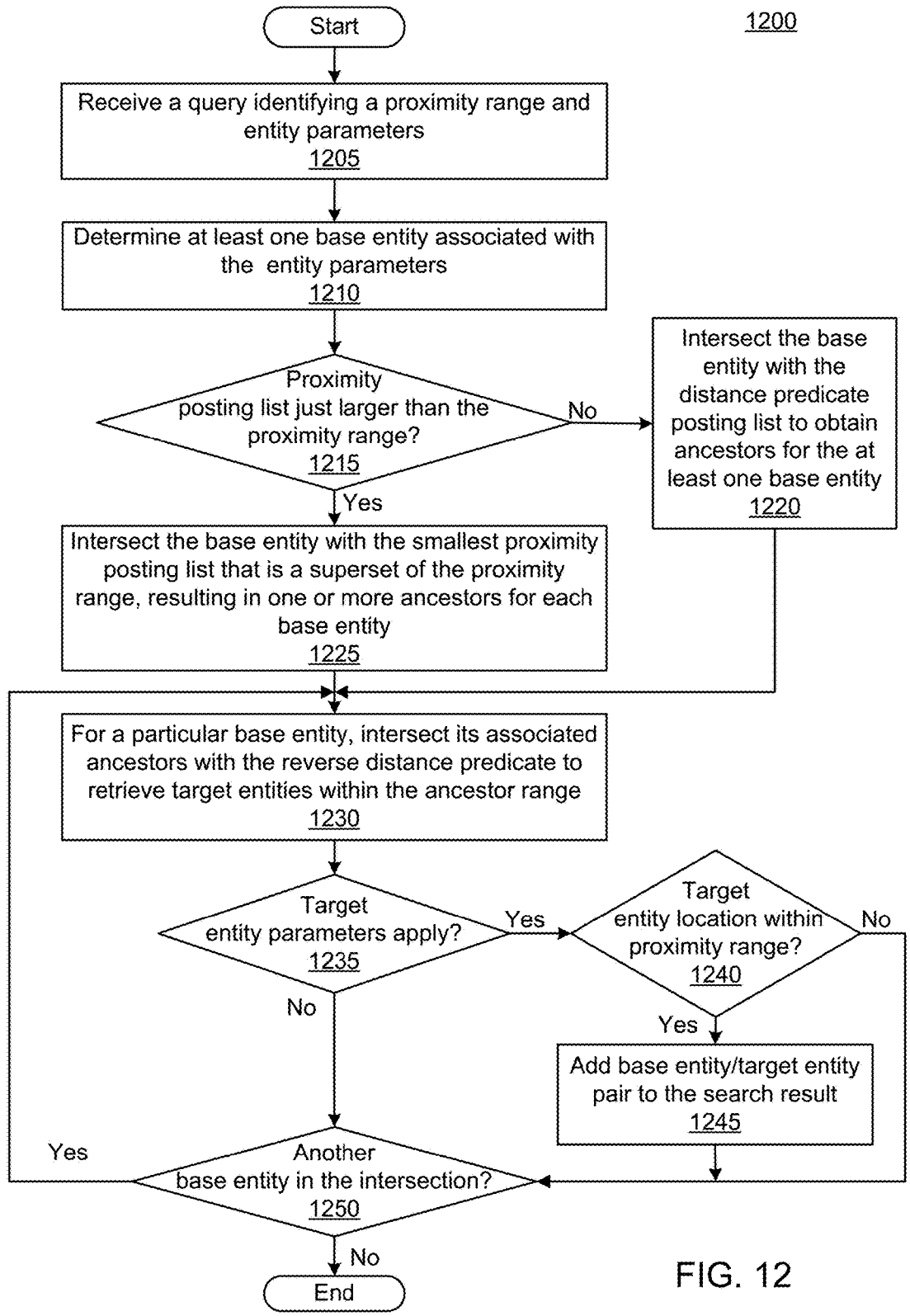
FIG. 12 illustrates a flow diagram of an example process for using proximity-query index posting lists.

FIG. 12 illustrates a flow diagram of an example process 1200 for using proximity-query posting lists. Process 1200 may be performed by a query resolver, such as query resolver 158, at query time. The query resolver may receive a query that identifies a proximity range and entity parameters (1205). The entity parameters may identify the types of entities that will serve as the base, or reference point for the proximity, and target entities. For example, the query may be "gas stations within 8 miles of a restaurant". In this example, the entity parameter indicates that entities that are restaurants will serve as the base entities and gas stations will serve as target entities. As another example, in the query "restaurants within 1 mile of Carnegie Hall," the entity that matches Carnegie Hall will serve as the base entity and restaurants will serve as target entities. The query parameters may thus identify one entity or a set or group of entities that will serve as the base for the proximity. Using the entity parameters, the query resolver may determine the base entities (1210). For example, given the first query example above, the query resolver may identify entities that are restaurants.

The query resolver may also determine which proximity posting list to use (1215). The query resolver may select the proximity posting list that is a strict superset of the query proximity. Thus if the query requests gas stations within 8 miles of a restaurant, and the index includes posting lists 5-mile-radius, 10-mile-radius, 50-mile-radius and 100-mile-radius, the query resolver will choose the posting list for 10-mile-radius (1215, Yes). The query resolver may intersect the chosen posting list, e.g., 10-mile-radius, with the set of base entities (1225). The result of the intersection is a set of one or more result identifiers that represent ancestors of the location of respective base entities. As discussed above, the ancestors represent one or more groups of locations in the space. If none of the posting lists have a proximity that covers a strict superset (1215, No), the query resolver may use the distance posting list. Thus, the query resolver may intersect the base entity (or entities) with the distance predicate posting list to determine the result identifiers, which represent ancestors, for each base entity 1220.

For each base entity, identified in step 1210, the system may determine the target entities within the specified range. Thus, for a particular base entity, the query resolver may intersect the ancestors, determined in either step 1220 or 1215, with the reverse posting list entries in the distance predicate posting list (1230). This generates a set of result identifiers which represent target entities. The query resolver may determine whether a target entity matches the target entity parameters from the query (1235). For example, if the query requests restaurants within 1 mile of some base entity, the target entity is checked to see if it is a restaurant. If so (1235, Yes), the query resolver may determine whether the target entity is within the proximity range of the query (1240). For example, the context of each result identifier may contain the location of the particular target entity, and the query resolver may use the context to determine the pair-wise distance between the target entity and the base entity to determine whether it is within the proximity range of the query. For example, given a particular restaurant, or base entity, at a given location and a particular target entity at a given location, the query resolver may determine whether the distance between the two falls within the range specified in the query. If it does (1240, Yes), the base entity and target entity pair are added to a search result for the query (1245). The query resolver may perform steps 1235 and 1245 as needed for each target entity associated with a particular base entity as part of step 1230.

If other base entities exist that have not been processed (1250, Yes), the query resolver may repeat steps 1230 through 1250 for each base entity to obtain the base entity/target entity pairs that fall within the query range. When all base entities have been processed (1250, No), process 1200 completes. The search result generated in step 1245 may then be used to provide results to the query requester or as further input to other query processes. By limiting the pair-wise distance calculation to entities that fall within a distance-predicate of each other, the system is able to provide results for proximity queries with very low latency even when hundreds of thousands of base entities are identified by the query.

In some implementations, the query may specify a particular location rather than entity parameters. For example, rather than requesting all restaurants within 1 mile of Carnegie Hall, the query may specify all restaurants within a given latitude/longitude. In such implementations, the query resolver may convert the latitude/longitude to a location in a base unit of the location hierarchy for the space. After the conversion, the query resolver may determine which ancestor covers the location and the proximity range for the query. In some implementations, the query resolver may use a covering operation to determine the ancestors. For example, in the date context, given a date of "1954" and a distance of 5 years, the covering operation may generate all months within 5 years of the date, assuming that month is the appropriate granularity. In other words, if base unit is a day, the ancestor granularity may be a month. As another example, if the distance is 100 years, the granularity of an ancestor may be one year, so that the covering operation generates ancestor identifiers for years within 100 years of 1954. Using this ancestor, the query resolver may perform steps 1230-1245 using the ancestor to determine which entities of the appropriate type are within the proximity range of the query. One modification of step 1245 is that a base entity does not exist, so the result list would just contain the target entity. Although described above as an example of a latitude/longitude for a geographic space, the principles apply equally to other query spaces where entities occupy a fixed location in the space and distances can be measured, such as date, time, and other maps.

Query Processing

In some implementations, the system may include a procedural language for querying the graph index. A query may be a sequence of operations performed on a set of posting lists identified by the query writer. The query writer may be a person or a module that translates a request from a person to the procedural language. The operations may be performed on an individual posting lists or a sequence of posting lists. For example, the operations may include fetch, expand, seek, intersection, and union operators. A fetch operator obtains the posting list specified. An expand operator walks either the entire posting list (i.e., all intersection identifiers) or a set of specified intersection identifiers and enumerates the corresponding result identifiers. In other words, the expand operator returns all result identifiers for some set, including the entire set, of intersection identifiers in the posting list. The seek operator locates a particular intersection identifier in a posting list and may return the result identifiers for that particular intersection identifier. In other words, the seek operator is similar to an expand operator for a set of intersection identifiers.

The intersect and union operators operate across two or more posting lists, or cross-stage. The intersection operator may match intersection identifiers between the two posting lists or may match the result identifiers in the first posting list with intersection identifiers in the second posting list. The union operator also operates on multiple posting lists in a similar fashion, except performing a union instead of an intersection.

A query for the graph may identify one or more stages. Each stage may identify either a posting list on which to operate, a traverse operation, or a sub-query. If the stage identifies a posting list, it may also identify an operator for the posting list. For example, the stage may identify the seek or expand operator for the posting list. If the stage specifies a posting list without an operator, the stage simply fetches the posting list and the result of the stage is the entire posting list. For example, if the stage identifies the acted_in posting list, the result of the stage is all entities who have acted in a movie. These entities represent the intersection identifiers of the forward posting list for acted_in. The stage may specify a reverse posting list as well, for example !acted_in, or acted_in$^{-1}$, or ^acted_in, etc. If the stage specifies the reverse posting list in this example, the result is the movies that actors have acted in, or the intersection identifiers of the reverse posting list.

The stage may also specify an operator with the posting list. For example, if the stage specifies the posting list with an expand operator, the result of the stage is the entire list of result identifiers for the posting list. In the acted_in example, this would be the movies actors have acted in. Thus, an expand operator on a forward posting list returns the same result as just specifying the reverse posting list without an operator. If the stage includes a seek operator, the results of the stage are limited to the entities or predicates specified by the seek operator. The seek operator may indicate that the operation is performed on either intersection identifiers (e.g, seek_intersection_term) or result identifiers (e.g., seek_result_term) for the posting list. For example, the seek operation may specify some set of actors, which are the intersection identifiers for the acted_in posting list, or the seek operation may specify some set of movies, which are the result identifiers for the acted_in posting list. In some implementations, if the stage includes multiple seek operators, the results of the stage may include the results from each seek operation, so that the query resolver uses an implicit OR between the seek operators. As used in this application, evaluating a stage means returning a list of identifiers for the stage. Thus, if a stage is evaluated, the query resolver obtains a list of identifiers as a result.

Some implementations may include a negation operator. The negation operator filters out certain items from the result of a preceding stage. For example, if the first stage of a query selects US Presidents, a second stage may generate US vice presidents and include a negation operator. The negation operator would remove any presidents that were also vice presidents from the result list. Because the negation operator operates on an incoming posting list in addition to the posting list specified in its stage, the negation operator may not be used in the first stage of a query.

Union and intersection operators may operate across multiple stages, or cross-stage. The stages may be executed sequentially or in parallel, depending on the type of operator. For example, if the query is an AND-HIT intersection query, the stages are executed sequentially with the results of a stage being intersected with the intersection identifiers of the next stage prior to performing stage operators like expand and negate. In other words, the results of a stage are used as input for the next stage. If the query is an AND-RESULT intersection query, the stages are executed in parallel with the same incoming identifiers and the results of the stages are intersected. For example, a first stage may find US presidents and a second stage may find people born in Nebraska. If the query is an AND-RESULT query, the evaluated results of each stage are intersected to provide US presidents born in Nebraska. The query may also be an OR-RESULT union query, which works like the AND-RESULT but performs a union on the results of the stages rather than an intersection. And OR-RESULT is useful when it is part of a sub query.

Any stage may also include a final results tag that indicates the evaluated results of the stage should be included in a final result. For example, in a query with multiple stages, a subset of the stages may appear in the final result with the rest acting as constraining/filtering clauses. The final results tag may provide fine-grained control on the exact information that makes up the final query result. Each stage with a final results tag produces tuples to add to the final result. The tuples may have the format of <subject_name, object_name> if the posting list is for a predicate or <subject_name, predicate_name> if the posting list is for an entity. The results tag may cause the tuples to be provided with the search result of the stage during the reverse path, as explained in more detail below with regard to FIG. 14.

A stage may also specify a special traverse-link operator. The traverse-link operator takes the set of incident entity identifiers from the previous stage and traverses the graph one hop from these entities, returning the results of the hop. In other words, the traverse-link operator can be viewed as a breadth first search exploring the entities at a distance of one starting from the incident entities. Thus, a stage with a traverse-link operator does not itself specify a posting list.

Instead, the predicate posting lists that include the incident identifiers are evaluated. Incident identifiers are the identifiers provided to the stage from a previous stage. The traverse operator may specify outgoing links, incoming links, or all links. Outgoing links may be thought of as forward traversal, with the incident identifiers as the subject. Incoming links may be considered a reverse traversal, with the incident identifiers as the objects. The traverse-link operator can be used in conjunction with a seek operator in the stage, so that the results of the breadth-first search are narrowed.

A stage may also specify a sub-query. A sub query stage includes its own query path with its own stages. The entire sub query may be evaluated before proceeding to the next stage of the query. The sub-query is evaluated with any incident identifiers, e.g., incoming identifiers from the previous stage. For example, the second stage may be a sub-query that uses the evaluated results of a first stage as incident identifiers. If the sub-query is a type of AND_HIT, the default result is the post-intersection list of identifiers pertaining to the subject of the first component of the sub-query unless otherwise specified. The evaluated result of an AND_HIT sub query corresponds to the result specified in the sub-query. For AND_RESULT and OR_RESULT, the evaluated result of the sub-query is implicit and corresponds to the intersection and union of all the stages in the sub-query respectively. The evaluated result of a stage that specifies a sub-query is the result of the sub query.

A query may also specify a maximum result count. For example, some of the posting lists in the index may be very large. The query resolver may cap the number of identifiers in the results that are sent to a next stage, or cap the number of identifiers in the final result for efficiency. In some cases the cap may be undesirable and the query requester may specify a maximum result count that exceeds the cap. In some implementations, a maximum result count may be specified for a particular stage rather than the entire query. In some implementations, if the stage returns more than the maximum result count, the query resolver may set a flag indicating that results were truncated, so that the query requester can specify a higher maximum result count and resubmit the query, if desired.

Query execution may include both a forward path and a return path. Unlike a traditional web search where the reverse path simply sends back responses, in some implementations the reverse path includes query execution logic and pruning. In the forward path, stages are evaluated and the results of the stages are sent to the next stage in the query path. When the last stage in the path has been evaluated, the last stage may initiate the reverse path. In the reverse path, a stage receives a subset of the identifiers it sent to the next component in the path. The subset is the result of an intersection between the outgoing list of identifiers it sent in the forward path and posting lists in the downstream stages. The stage uses the subset to prune the list of intersection identifier/result identifier pairs, or intersection identifiers it generated in the forward path to generate the result set for the stage. If the stage included an expand operator, it may map the list of result identifiers to the corresponding set of intersection identifiers pertaining to the pruned results. Thus, it sends a subset of identifiers that it had received in the forward path to its predecessor stage plus any tuples it received from a descendent stage. If the stage also included a result tag, it will include the set of tuples in the data sent to the predecessor stage.

In order to map from the pruned list of result identifiers back to the intersection identifiers of the predecessor, the stage may use an entity map. The entity map may be a structure that stores the list of intersection identifier→result identifiers pairs generated in the forward path, but the map may be indexed by result identifier, so that the list is stored as result identifier→intersection identifiers. The entity map facilitates fast intersection with the subset of result identifiers received from the downstream stage to generate the final list of tuples as its result. The entity map also generates the subset of intersection identifiers that is sent to its predecessor stage in the forward path. This subset is the list of hits corresponding to the subset of result identifiers received back from the downstream stage. In some implementations, the entity map may be implemented as a posting list, mapping from one identifier space to another. In some implementations, during the forward path the query resolver may take the list of intersection identifier→result identifier pairs it has generated and form a two-dimensional posting list with the result identifiers in the intersection identifier dimension and the intersection identifiers in the result identifier dimension. In some implementations, the posting list may also store a context.

In the forward path, when execution is at a particular stage, the query results (intersection→result pair or just intersection identifier) generated at the stage satisfies the constraints specified by all of its upstream, or predecessor, stages. Therefore, the last stage in the path satisfies the whole constraint of the query. In the reverse path, a stage receives a subset of identifiers from the next downstream stage, such that the subset satisfies the constraints specified by all the downstream stages as well. Because the forward path ensures all constraints upstream are satisfied and the reverse path ensures all constraints downstream are satisfied, if a stage generates a result in the reverse path the result satisfies the constraints specified by the whole query. Thus, the result tag of a stage is processed in the reverse path.

In some implementations, query execution may include two phases, a retrieval phase that focuses on getting the pruned set of top-level result entities for the query and a filling phase that generates details for the pruned top-level entities. In other words, the retrieval phase focuses on finding a minimum set of entities and the filling phase focuses on obtaining details for the minimum set. For simple queries the filling phase may be optimized away, but for more complex queries, such as queries invoking parallel processing, the query execution may include the filling phase. Examples of queries that may invoke parallel processing include those involving a sub-query, a transform operator, or proximity queries where downstream stages are used to determine the minimum set of entities. Although discussed above with regard to minimum entities, implementations could also find a minimum number of predicates. Thus, the two phrases apply equally to entity posting lists and predicate posting lists. Because the bulk of the work required in the filling phase is posting list fetching and intersections, to optimize the filling phase and reduce network latency costs, the filling phase may re-use work performed during the retrieval phase. For example, the retrieval phase may have a query-level cache indexed by a unique query identifier. At the end of the retrieval phase for each stage, the query resolver may add the query result generated in the retrieval phase into this cache so that the filling phase can resume the query from that state. When the filling phase completes, the cache may be reclaimed. The filling phase may be initiated by a parallel query stage, e.g., a sub-query or traverse operator, during the reverse path. For example, when the stage that includes a sub-query receives a pruned subset of identifiers to the downstream stage during the reverse path, the stage may initiate filling phase execution in order to generate results. The retrieval phase may include both a forward and reverse path, and the filling phase may also include a forward and reverse path.

Figure 13A:
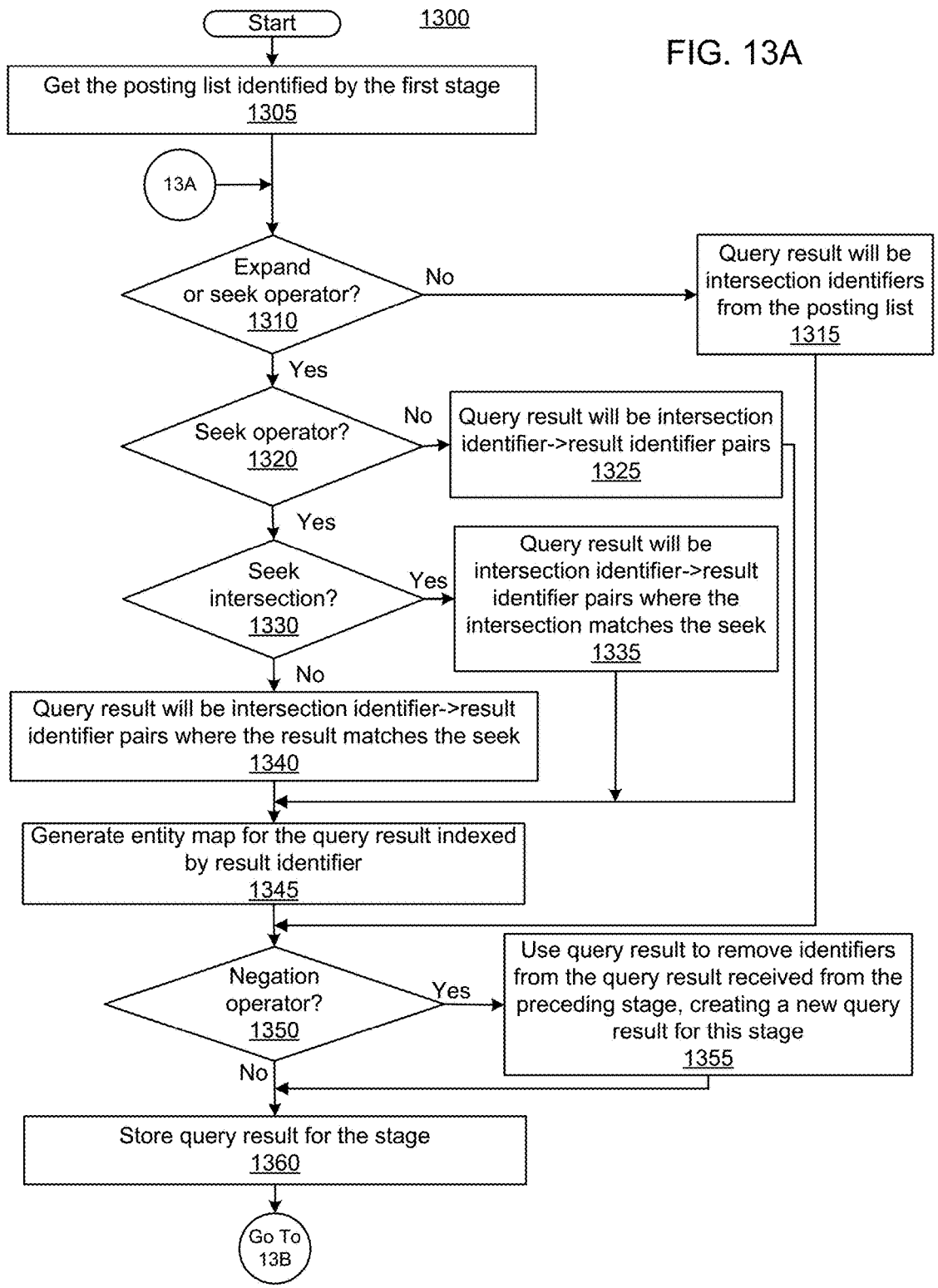
FIGS. 13A and B illustrate a flow diagram of an example forward path of a query execution process for an intersection operator.

FIGS. 13A and B illustrate a flow diagram of an example forward path 1300 of a query execution process for an intersection operator, specifically and AND-HIT. The forward path process 1300 may be executed by a query resolver, such as query resolver 158 of FIG. 1. In some implementations, portions of process 1300 may be performed by separate servers in a distributed index. For example, different posting lists may be stored on different servers in a distributed indexing system. Thus, as each stage in the query path ends, the server processing the stage may pass information that can include the query results from the stage, all or portions of the query plan, and tuples to the next server for processing. In some implementations, a root node may compile or aggregate results from multiple servers.

Process 1300 may begin with the query resolver obtaining a posting list identified by the first stage of a query (1305). The posting list may be any type of posting list, for example a subject posting list, a predicate posting list, a reverse predicate posting list, etc. The query resolver may next determine whether the stage includes an operator for the individual posting list (1310). If the stage does not include an individual posting list operator (1310, No), the query result becomes the intersection identifiers for the posting list (1315). If an expand operator is identified (1310, Yes) and (1320, No), the query results include intersection identifier→result identifier pairs from the posting list. This is because an expand operator expands the result to include the result identifiers for each intersection identifier. If the query resolver identifies a seek operator (1310, Yes) and (1320, Yes), the seek operator may seek intersection identifiers or result identifiers. If the seek operator is for a result identifier (1330, No), the query resolver may include intersection→result identifier pairs where the result identifiers match the identifiers specified by the seek (1340). If the seek operator is an intersection identifier (1330, yes), the query resolver may include intersection→result identifier pairs where the intersection identifiers match the identifiers specified by the seek (1335). In some implementations, the seek operator may specify identifiers to match through the use of another posting list or some other list. In some implementations, the stage may include more than one seek operator, so that steps 1330 to 1340 are repeated as needed to prune the query result.

If the query resolver encounters an expand or a seek operator for the stage, the query resolver may build an entity map of the query results (1345). The entity map is a structure that stores the list of intersection→result identifier pairs generated for the result and indexes them by result identifier. The entity map allows the query resolver to quickly translate the result identifier back into its corresponding intersection identifier on the return path, as will be explained in more detail below with regard to FIG. 14. In some implementations, the entity map may be stored as a posting list, with the result identifiers in the intersection identifier dimension, and the intersection identifiers in the result dimension. In some implementations, the entity map may also store a context. The context may assist the query resolver in sorting the final query results.

The query resolver may next determine whether the negation operator applies to the stage (1350). A negation operator removes entries from a query result of the predecessor stage. Thus, a negation operator will not be in the first stage of a query path. If the stage is not a first stage and the query resolver finds a negation operator (1350, Yes), the query results of the current stage, determined in steps 1315 to 1340, are used to remove entries from the query results of the previous stage (1355), generating pruned query results. The pruned query results may then be considered the query results for the current stage. If no negation operator is found (1350, No) or after generating the pruned query results (1355), the query resolver may store the query results for the current stage (1360). The stored results may be the identifiers passed to the next stage as incident identifiers. The stored results may be used in the reverse path or filling phase, as discussed in more detail below with regard to FIGS. 14 and 15. The incident identifiers may be the result identifiers from the query results if the stage includes an expand or seek operator, and the intersection identifiers otherwise. The query resolver may then determine whether another stage exists in the query path (1365 of FIG. 13B). If no other stage exists (1365, No), the forward path has finished, and the query resolver may initiate the reverse path, which is illustrated as process 1400 of FIG. 14.

If another stage does exist (1365, Yes), the query resolver may determine whether the next stage is a sub-query (1370). A sub-query may include a second query path with its own stages, using the query result of the previous stage as input. If the next stage is a sub-query (1370, Yes), the query resolver may execute the sub-query to obtain a search result (1375). Executing the sub-query stage may cause the system to initiate another process 1300, starting at step 1305, except that the first stage of the sub-query may intersect the posting list identified in step 1305 with the incident identifiers from the upstream stage, so that the sub-query does not run for the full posting list identified at step 1305. In some implementations, the sub-query may generate a single result set as a query result. This may include collapsing query results from stages in the sub-query into a single result. The query result for the sub query may then be used as incident identifiers for the next stage, if one exists (1365).

If the next stage is not a sub-query (1370, No), the query resolver may determine whether the next stage is a traverse stage (1380). A traverse stage is a special stage that traverses one hop for a set of entity identifiers and returns the entities on the other end as the search result. Thus, a traverse stage may be viewed as a breadth first search exploring the entities at a distance of one, starting from the entities identified in the incident identifiers. The incoming entities of a traverse stage are the search results from a prior stage. If the stage is not a traverse stage (1380, No), the query resolver may pass the incident identifiers of the current stage to the next stage, intersecting the incident identifiers with the posting list identified in the next stage (1395). As mentioned above, if the query results include intersection identifier→result identifier pairs, the result identifiers may be the incident identifiers intersected with the intersection identifiers of the posting list. Otherwise, the intersection identifiers of the query result may be the incident identifiers intersected with the intersection identifiers of the posting list. The next stage then becomes the current stage for the purposes of process 1300, and processing continues at step 1310 of FIG. 13A for the current stage.

If the next stage is a traverse stage (1380, Yes), the traverse stage becomes the current stage for the purposes of process 1300 and the query resolver may look for entity posting lists, e.g., subject posting lists or object posting lists, that include the entity represented by the incident identifiers (1382). As explained above, incident identifiers are the result identifiers from an upstream stage. In some implementations, the traverse stage may include one or more seek operators that further narrow the query result. If the stage does not include a seek operator (1384, No), the query result will be the intersection identifier→result identifier pairs from the predicate posting lists that include the incident identifiers as intersection identifiers (1386). If the stage includes a seek intersection operator (1384, Yes) and (1388, Yes), the query result will be be the intersection identifier→result identifier pairs from the entity posting lists that include the incident identifiers as intersection identifiers that also match the seek identifiers (1390). If the stage includes a seek result operator (1384, Yes) and (1388, No), the query result will be the intersection identifier→result identifier pairs from the predicate posting lists that include the incident identifiers as intersection identifiers that also have result identifiers that match the seek identifiers (1392). The query resolver may generate and store an entity map for the stage (1394) as discussed above with regard to step 1345. The query resolver may also store the query result for the stage (1396). The stored query result may include the result identifiers from the pairs and may represent a state after execution for the stage. The traverse stage has then completed, and the query resolver may determine whether a next stage exists, for example at step 1365, and pass the query result as the incident identifiers for the downstream stage, if any. Process 1300, which represents a forward path for the query, ends when a next step is not found and the reverse path for the query begins.

Figure 14:
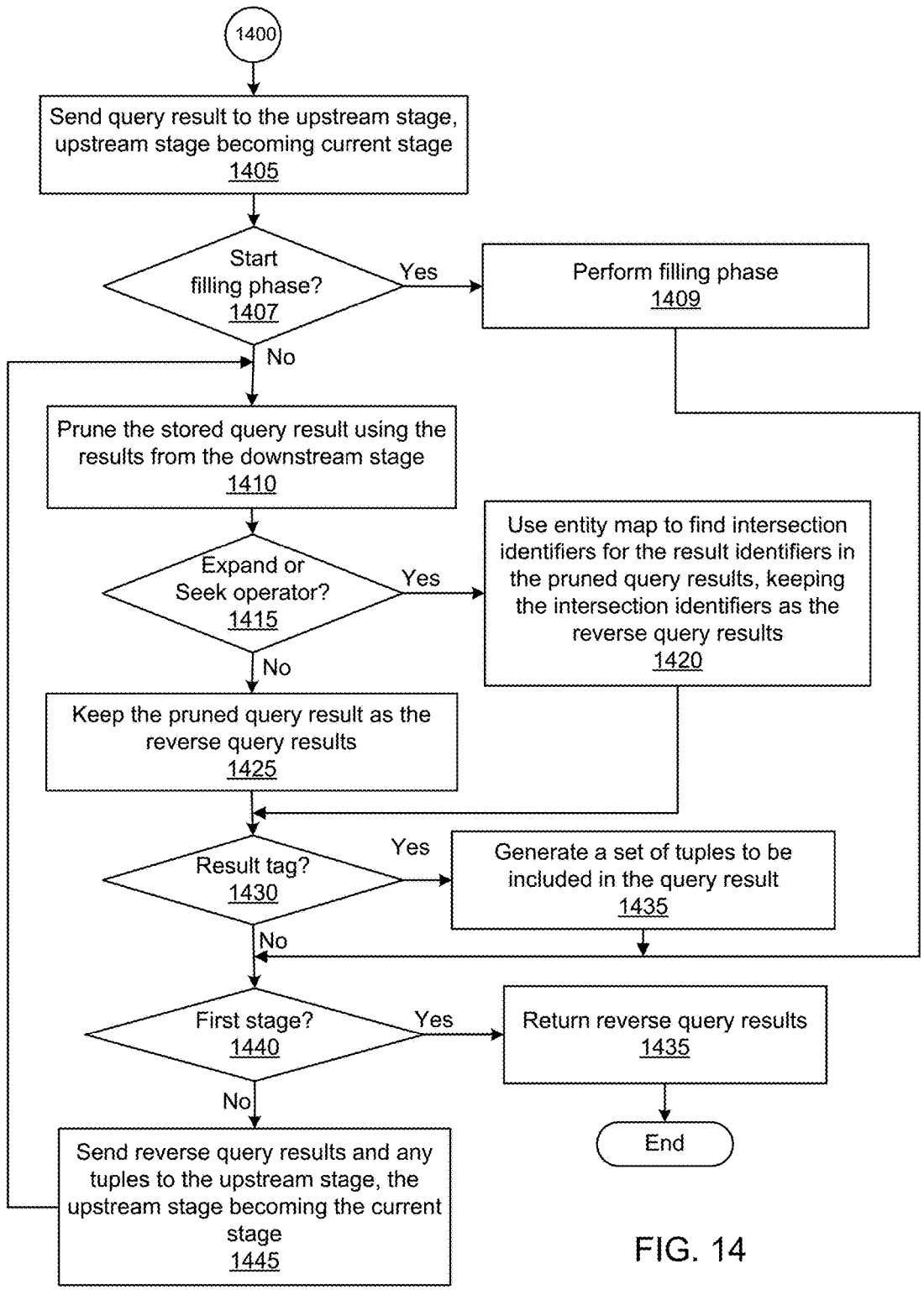
FIG. 14 illustrates a flow diagram of an example reverse path of a query execution process for an intersection operator.

FIG. 14 illustrates a flow diagram of an example reverse path of a query execution process for an intersection operator. Like the forward path process 1300, the reverse path process 1400 may be executed by a query resolver, such as query resolver 158 of FIG. 1. In some implementations, portions of process 1400 may be performed by separate servers in a distributed index. For example, different posting lists may be stored on different servers in a distributed indexing system, as described above with regard to FIG. 13A, but with the server passing the query results from the current stage to the previous server for processing. In some implementations, a root node may compile results from multiple servers.

Process 1400 may begin with the query resolver sending the query result from the last downstream stage to the previous stage (1405). As indicated above, this may include sending the results from one server or leaf node to another. The previous stage may now represent the current stage. If the current stage is a parallel query, for example a sub-query, a traverse operator, a union operator (1407, Yes), the query resolver may initiate a filling phase (1409), as explained above, the filling phase provides details for the retrieval phase, performed in the forward path. If a filling phase is not applicable (1407 No), the query resolver may retrieve the stored query result for the current stage, for example the result stored as part of step 1360 of FIG. 13A, prune the query result (1410). Pruning may occur based on the result from the downstream stage, received as part of the reverse path. For example, the query resolver may intersect the results from the downstream stage with the stored query result, so that any results pruned in the later steps of the query path are also pruned at the current stage. If the current stage includes an expand or a seek operator (1415, Yes), the query resolver may use the entity map stored for the stage to find the intersection identifiers that correspond with the result identifiers that remain in the query result (1420). The intersection identifiers may then become the reverse query result. If the stage does not include an expand or seek operator (1415, No), the reverse query result is the pruned result (1425).

Figure 13B:
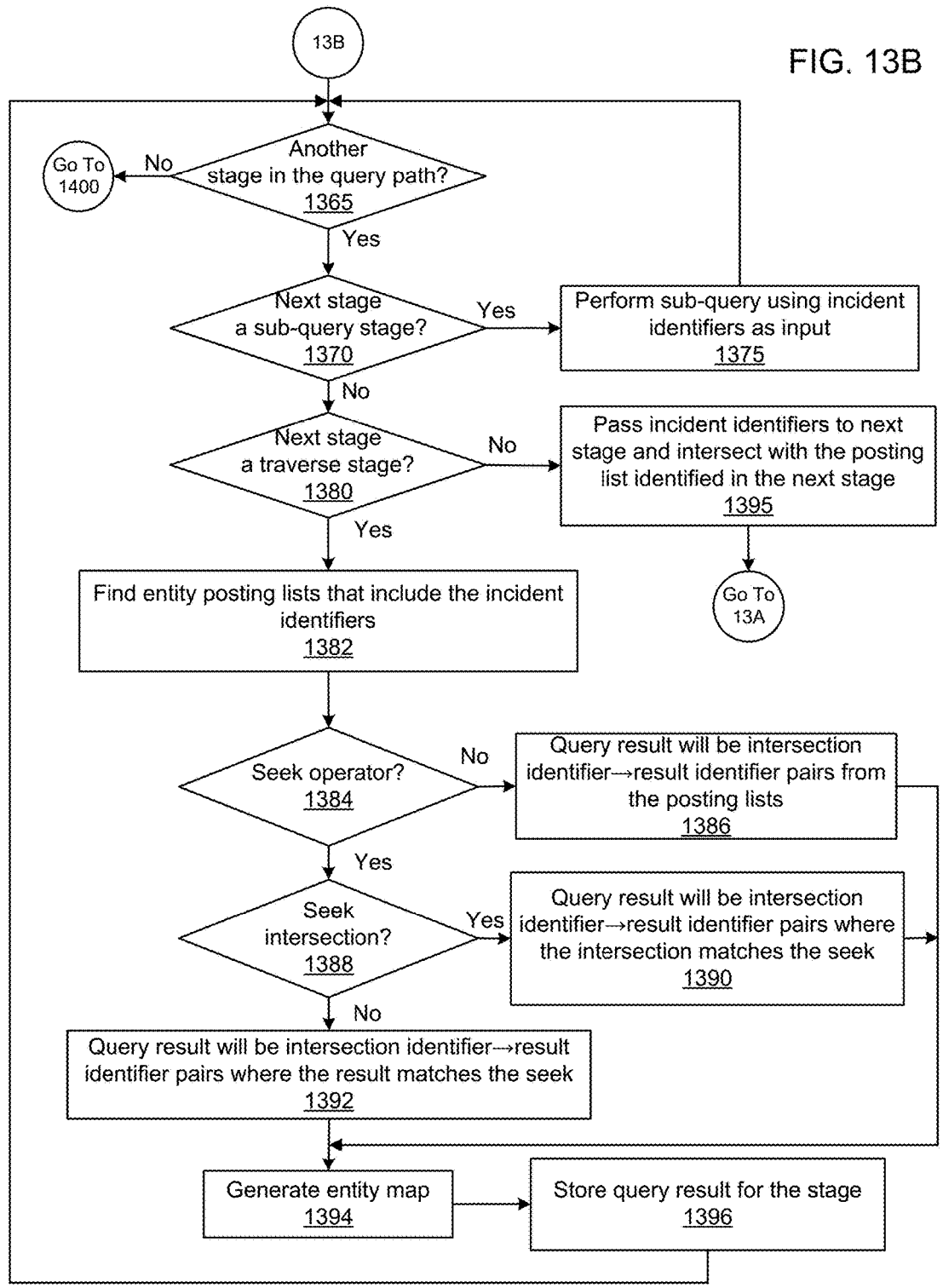

If the current stage includes a result tag (1430, Yes), the query resolver may generate a set of tuples to be included in final query results (1435). The tuples may represent subject-object pairs or subject-predicate pairs depending on the type of posting list specified in the stage. As explained above, after pruning of the query result using the downstream incident identifiers, the tuples generated in the reverse path satisfy the whole query constraint. If the current stage is not the first stage (1440, No), the query resolver may send the reverse query results and any tuples generated to the upstream stage in the query path, the upstream stage becoming the current stage (1445). Steps 1410 to 1440 are then repeated for the new current stage. If the stage is the first stage in the query path (1440, Yes), the reverse query results and any tuples are returned (1435), and process 1400 ends. In some implementations, the results at the leaf may be returned to a root node for further processing. Although FIGS. 13A, 13B, and 14 illustrate an AND_HIT operator, similar steps may be taken for an OR operator, except that the results of each stage are joined with the results from other stages, rather than intersected.

Figure 15:
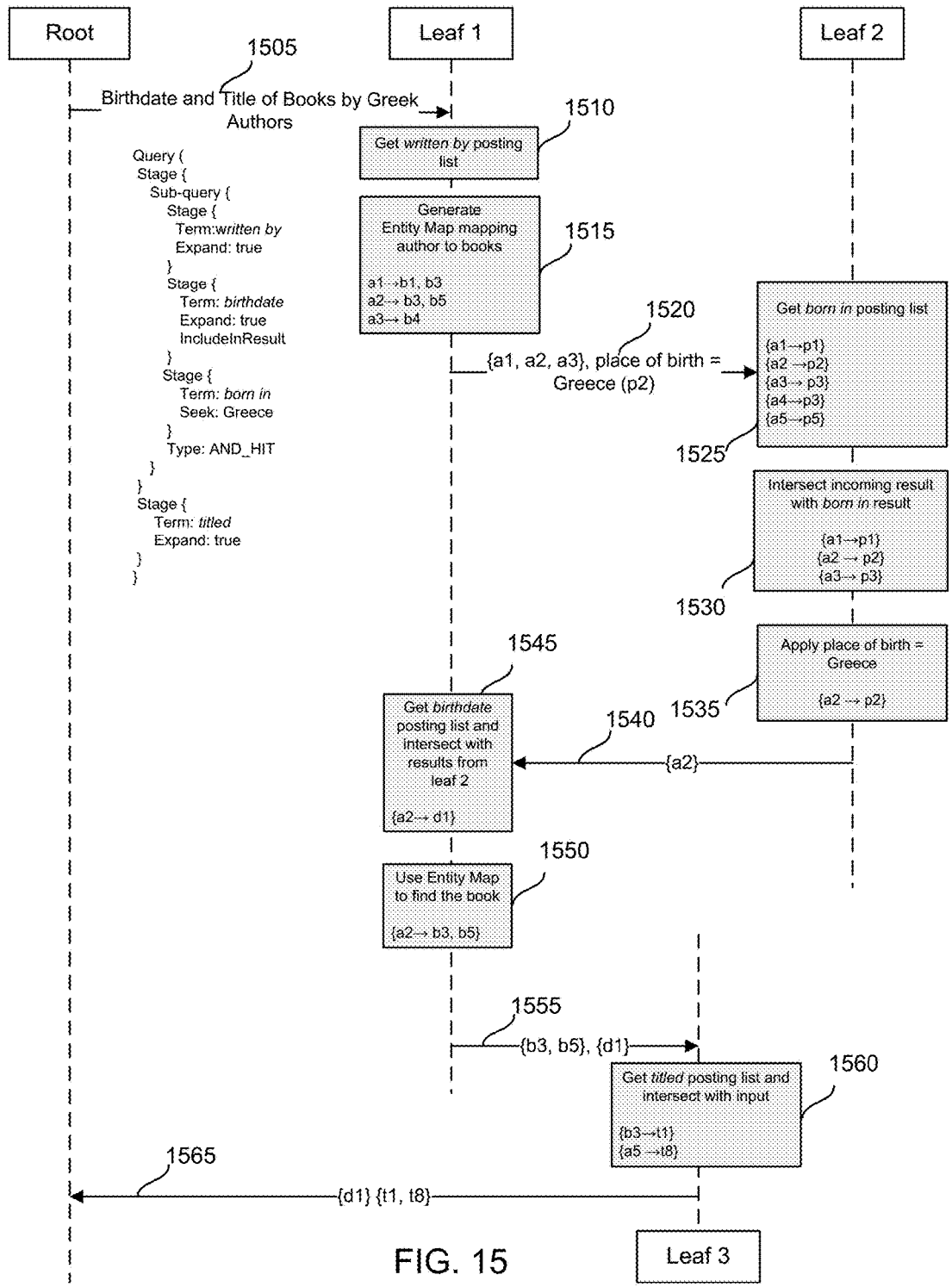
FIG. 15 illustrates an example of a two phase query execution process.

FIG. 15 illustrates an example of a two phase query execution process with query processing occurring in the return phase. In the example of FIG. 15, the query is for the birth date and title of books by Greek authors. In the example of FIG. 15, the system is a distributed system, with a root processing node and three leaf processing nodes, Leaf1, Leaf2, and Leaf3. Of course other configurations with more nodes, including intermediate nodes between the root and leaf nodes, are possible. At 1505 the root may send the query to Leaf1 for processing. The root may choose Leaf1 because Leaf1 includes a predicate posting list for written by, the posting list specified in the query. The Leaf1 node may retrieve the written by posting list (1510) and perform an expand operator on the posting list. The expand is used because the written by posting list has authors as result identifiers, and the query needs authors to determine where each author was born. The expand operator may cause an entity map to be generated (1515). As explained above, the entity map stores the intersection identifier, in this case books, and the result identifier, in this case author, as pairs indexed by result identifier. Thus, as shown in FIG. 15, the entity map indexes the authors a1, a2, a3 and pairs them with the books they have written, b1, b2, b3, b4, and b5. Because of the expand operator, the result of the first stage is a list of the authors in the written by posting list, namely a1, a2, and a3.

These identifiers are passed to the downstream stage. The next stage obtains the birthdates of authors. However, for efficiency purposes, this stage should wait for further processing before proceeding. For example, if the stage obtained the birthdates for all authors, too many birth dates would be obtained. Accordingly, Leaf1 may initiate a retrieval phase to get the Greek authors before proceeding to get birth dates. Thus, Leaf 1 passes the author identifiers to the third stage, which determines place of birth (1520). In addition to the result identifiers, the message sent to Leaf2 may also include instructions for the next stage, such "place of birth=Greece." At Leaf2, the predicate posting list for born in is obtained (1525). This posting list is intersected with the incoming authors from the previous stage (1530). Thus, Leaf2 now has the place of birth for each of the three authors passed as incident identifiers to Leaf2. Leaf2 may then pare the result further, leaving authors born in Greece (1535). In some implementations this may occur through use of a seek operator. Because this is the last stage, the forward path for the query has completed. Accordingly, Leaf2 may initiate the reverse path and send its result, author a2, back to Leaf1 (1540). At Leaf1, the query resolver may initiate a filling stage to get the birthdates of authors obtained in the retrieval phase. In the example of FIG. 15, the birthdate posting list is also at Leaf 1, so Leaf1 may get the posting list and intersect the list with the author found in the retrieval phase (1545). The result of the filling phase may be date dl, which is also the reverse query result for the stage. Leaf 1 may then continue processing and use the entity map created at 1515 to map the author a2 back to the books b3 and b5 written by the author (1550). The books b3 and b5 become the reverse query result for this stage. Because this is the last stage of the Sub-query, Leaf 1 may initiate the next downstream stage, which obtains titles for the books. Accordingly, Leaf1 may send the result 1555 to Leaf3 with a request to find the titles. Leaf3 may then initiate another stage (1560) to obtain the title of books b3 and b5. Leaf3 may send the result of the stage back to the root node, along with the birth date obtained in an earlier stage. FIG. 15 thus illustrates a forward path and reverse path processing as well as retrieval and filling phases.

Figure 16:
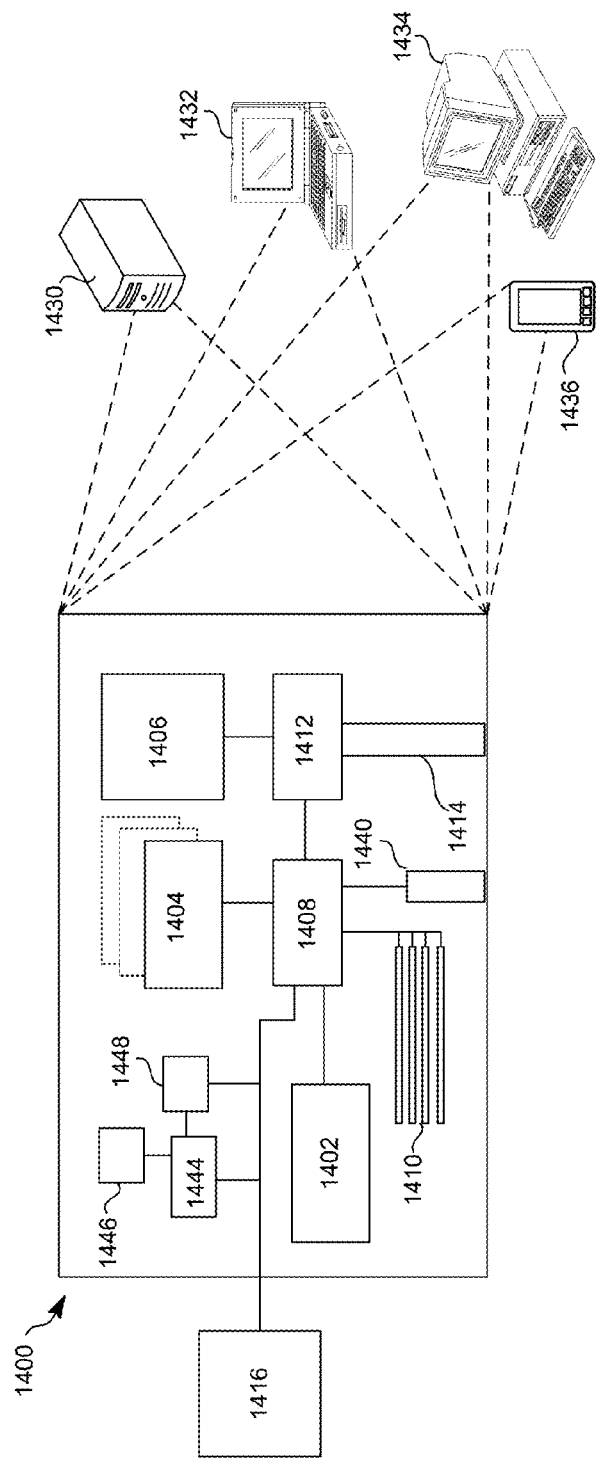
FIG. 16 shows an example of a computer device that can be used to implement the described techniques.

FIG. 16 shows an example of a generic computer device 1600, which may be system 100, and/or client 170 of FIG. 1, which may be used with the techniques described here. Computing device 1600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1600 includes a processor 1602, memory 1604, a storage device 1606, and expansion ports 1610 connected via an interface 1608. In some implementations, computing device 1600 may include transceiver 1646, communication interface 1644, and a GPS (Global Positioning System) receiver module 1648, among other components, connected via interface 1608. Device 1600 may communicate wirelessly through communication interface 1644, which may include digital signal processing circuitry where necessary. Each of the components 1602, 1604, 1606, 1608, 1610, 1640, 1644, 1646, and 1648 may be mounted on a common motherboard or in other manners as appropriate. Filter The processor 1602 can process instructions for execution within the computing device 1600, including instructions stored in the memory 1604 or on the storage device 1606 to display graphical information for a GUI on an external input/output device, such as display 1616. Display 1616 may be a monitor or a flat touchscreen display. In some implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk. In some implementations, the memory 1604 may include expansion memory provided through an expansion interface.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1604, the storage device 1606, or memory on processor 1602.

The interface 1608 may be a high speed controller that manages bandwidth-intensive operations for the computing device 1600 or a low speed controller that manages lower bandwidth-intensive operations, or a combination of such controllers. An external interface 1640 may be provided so as to enable near area communication of device 1600 with other devices. In some implementations, controller 1608 may be coupled to storage device 1606 and expansion port 1614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1630, or multiple times in a group of such servers. It may also be implemented as part of a rack server system. In addition, it may be implemented in a personal computer such as a laptop computer 1622, or smart phone 1636. An entire system may be made up of multiple computing devices 1600 communicating with each other. Other configurations are possible.

FIG. 17 shows an example of a generic computer device 1700, which may be system 100 of FIG. 1, which may be used with the techniques described here. Computing device 1700 is intended to represent various example forms of large-scale data processing devices, such as servers, blade servers, datacenters, mainframes, and other large-scale computing devices. Computing device 1700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1700 may include any number of computing devices 1780. Computing devices 1780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1780*a* includes multiple racks 1758*a*-1758*n*. Each rack may include one or more processors, such as processors 1752*a*-1752*n* and 1762*a*-1762*n*. The processors may include data processors, network attached storage devices, and other computer controlled devices. In some implementations, one processor may operate as a master processor and control the scheduling and data distribution tasks. Processors may be interconnected through one or more rack switches 1758, and one or more racks may be connected through switch 1778. Switch 1778 may handle communications between multiple connected computing devices 1700.

Each rack may include memory, such as memory 1754 and memory 1764, and storage, such as 1756 and 1766. Storage 1756 and 1766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1756 or 1766 may be shared between multiple processors, multiple racks, or multiple computing devices and may include a computer-readable medium storing instructions executable by one or more of the processors. Memory 1754 and 1764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1754 may also be shared between processors 1752*a*-1752*n*. Data structures, such as an index, may be stored, for example, across storage 1756 and memory 1754. Computing device 1700 may include other components not shown, such as controllers, buses, input/output devices, communications modules, etc.

An entire system, such as system 100, may be made up of multiple computing devices 1700 communicating with each other. For example, device 1780*a* may communicate with devices 1780*b*, 1780*c*, and 1780*d*, and these may collectively be known as system 100. As another example, system 100 of FIG. 1 may include one or more computing devices 1700 as indexing system 110 or search system 120. Similarly, one or more computing devices 1700 may comprise index cluster 150. Furthermore, some of the computing devices may be located geographically close to each other, and others may be located geographically distant. The layout of system 1700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   a graph-based datastore representing entities connected by predicates; and
   a query serving system including:
      at least one processor, and
      memory storing:
         an index of the graph-based datastore, the index including predicate posting lists, each predicate posting list having a plurality of intersection identifiers and, for each intersection identifier, at least one result identifier, the at least one result identifier identifying an entity connected by the predicate to an entity identified by the respective intersection identifier; and
         instructions that, when executed by the at least one processor cause the query serving system to:
            receive a query that executes in at least two stages, each stage associated with a different predicate posting list from the index,
            execute a forward query path on the stages to generate first query results, wherein executing the forward query path includes:
               applying an expand operator on a predicate posting list for a first stage to generate intersection identifier-result identifier pairs,
               generating a list of result identifiers as first stage query results, and
               providing the first stage query results to a downstream stage as incident identifiers, and
            execute a reverse query path on the stages to generate second query results, where the first query results include different entities than the second query results.

2. The system of claim 1, wherein executing the forward query path also includes generating an entity map from the intersection identifier-result identifier pairs, the entity map being indexed by result identifier.

3. The system of claim 2, wherein executing the forward query path includes:
   intersecting the incident identifiers with intersection identifiers from a predicate posting list for the downstream stage to generate the first query results.

4. The system of claim 3, wherein executing the reverse query path includes:
providing the first query results to the first stage; and
using the entity map and the first query results to generate the second query results.

5. The system of claim 4, wherein using the entity map includes:
intersecting the first query results with the result identifiers of the entity map to find matching result identifiers; and
selecting the intersection identifiers associated with matching result identifiers as the second query results.

6. The system of claim 1, wherein executing the reverse query path includes further processing of the first query results to generate the second query results.

7. The system of claim 1, wherein entities of the first query results differ in type from the entities of the second query results.

8. The system of claim 7, wherein executing the reverse query path translates the entities of the first query results into the entities of the second query results.

9. A system comprising:
a graph-based datastore; and
an indexing system including:
at least one processor,
a memory storing an index for searching the graph-based datastore, the index including:
posting lists for one or more proximity ranges compatible with a space, a posting list including:
one or more entities of a type compatible with the space, each entity having a location within the space, the location being a basic unit in a location hierarchy for the space, and
for each entity, at least one node in the location hierarchy that falls within the proximity range of the posting list with reference to the location of the entity,
at least one distance-predicate posting list that includes nodes in the location hierarchy and, for each node, one or more entities of a type compatible with the space and located within an area represented by the node, and
a memory storing instructions that, when executed by the at least one processor cause the indexing system to use the index to respond to a query that includes a query proximity range for the space.

10. The system of claim 9, wherein the at least one node has a respective associated context that represents the location for the entity.

11. The system of claim 9, wherein responding to the query includes:
identifying at least one base entity associated with entity parameters from the query;
selecting a posting list with a proximity range larger than the query proximity range;
using the selected posting list to locate the one or more nodes for the at least one base entity;
using the distance-predicate posting list to locate one or more target entities for the at least one base entity; and
generating a query result that includes information for the at least one base entity and the one or more target entities.

12. The system of claim 11, wherein the one or more entities of the distance-predicate posting list has an associated context that represents the location for the associated entity in base units.

13. The system of claim 12, wherein locating the one or more target entities includes:
calculating a distance between the base entity and the target entity using the context of the target entity; and
including the target entity in the query result when the distance is within the proximity range for the query.

14. The system of claim 11, wherein the distance-predicate posting list includes forward distance-predicate entries that include:
a plurality of entities of a type compatible with the space; and
for each entity, the nodes in the location hierarchy that represent an area encompassing the location of the entity.

15. The system of claim 14, wherein responding to the query includes:
determining that a posting list with a proximity range larger than the query proximity range does not exist; and
using the forward distance-predicate entries to locate the one or more nodes for the at least one base entity.

16. The system of claim 9, wherein responding to the query includes:
calculating a location that corresponds to a basic unit of the hierarchy from a value specified in the query;
determining the nodes in the hierarchy with an area covering the query proximity range;
using the distance-predicate posting list to locate one or more target entities for the location; and
generating a query result that includes information for the one or more target entities.

17. A search index for performing low-latency searches of a data graph, the data graph having entities linked by predicates, the search index comprising:
predicate posting lists, wherein a predicate posting list for a particular predicate includes subject entities and one or more object entities related to respective subject entities by the particular predicate;
bucket posting lists that represent ranges of object values for a predicate, a bucket posting list for the particular predicate includes at least one subject entity related by the particular predicate to at least one object entity having an object value that falls within a start value and an end value for the bucket posting list; and
object-rank posting lists, wherein an object-rank posting list for the particular predicate includes subject entities and one or more object entities related to respective subject entities by the particular predicate, wherein each object entity is associated with a rank; and
wherein the start value and the end value for the bucket posting lists are associated with respective ranks,
wherein the search index is stored a non-transitory computer-readable medium on one or more computing systems in communication with an indexing server and a query server and is used to generate search results in response to queries.

18. The search index of claim 17, wherein the query server comprises:
at least one processor; and
a memory storing instructions that, when executed by the at least one processor, cause the query server to:
receive a query that includes a range for the particular predicate;
convert the range to a query start rank and a query end rank;
determine, using the at least one processor, at least one bucket posting list for the particular predicate from the search index that has a start value less than the query end rank and an end value greater than the query start rank, the at least one bucket posting list having at least a first subject entity;

determine first object entities related to the first subject entity using the object-rank posting list and the bucket posting list for the particular predicate;

determine whether the first object entities have an associated rank within the query start rank and query end rank; and generate a query result that includes information from the first subject entity and the first object entities that have an associated rank within the query start rank and the query end rank.

19. The search index of claim 17, wherein the query server comprises:

at least one processor; and a memory storing instructions that, when executed by the at least one processor, cause the query server to:

receive a query that includes a request to sort the search results by object entity for the particular predicate;

determine, using the at least one processor, query results, the query results including first subject entities;

order the query results based on the ranks of the object entities in a bucket posting list for the particular predicate; and provide information from the ordered query results as the search results.

20. The search index of claim 17, wherein the query server comprises:

at least one processor; and a memory storing instructions that, when executed by the at least one processor, cause the query server to:

receive a query that includes a range for the particular predicate, the range represented by a query start value and a query end value;

determine, using the at least one processor, at least one bucket posting list for the particular predicate from the search index that has a start value less than the query end value and an end value greater than the query start value, the at least one bucket posting list having at least a first subject entity;

determine first object entities related to the first subject entity using the predicate posting list and the bucket posting list for the particular predicate;

determine whether the first object entities have an object value within the query start value and query end value; and generate a query result that includes information from the first subject entity and the first object entities that have an object value within the query start value and the query end value.

21. A system comprising:

a graph-structured knowledge base that supplies triples for indexing, where a triple represents a subject linked with an object by at least one relationship; and an indexing system including:
  at least one processor, and
  memory storing:
    an index for searching the graph-structured knowledge base, each entry of at least some entries in the index having:
      a posting list value,
      a plurality of intersection identifiers associated with the posting list value, and
      for each of the intersection identifiers, one or more result identifiers, and
    instructions that, when executed by the at least one processor cause the indexing system to:
      generate and store, for at least one of the triples from the knowledge base, a subject index entry where the posting list value represents a subject of the triple, an object index entry where the posting list value represents an object of the triple, and a relationship index entry where the posting list value represents a relationship linking the subject and the object of the triple,
      pre-compute entries for the index representing an intersection between a first posting list value and a second posting list value, and
      store the pre-computed entries in the index.

22. The system of claim 21, wherein for at least one particular triple the instructions further cause the indexing system to perform operations comprising:

generating a search triple corresponding to the particular triple, the search triple including the subject of the particular triple, a text search aid as the object of the search triple, and a special relationship that indicates the object is a search equivalent of the subject; and generating an object index entry based on the search triple.

23. The system of claim 21, wherein at least one of the result identifiers in the index has a corresponding context value.

24. The system of claim 21, wherein pre-computing entries includes:

determining that an amount of triples represented by entries for the first posting list value and an amount of triples represented by entries for the second posting list value are large;

determining a result of an intersection between the entries of the first posting list value and the entries of the second posting list value; and performing the pre-computing when it is determined that the result of the intersection has significantly fewer members than the amount of triples represented by the entries for the first posting list and significantly fewer members than the amount of triples represented by the entries for the second posting list value.

25. The system of claim 24, wherein pre-computing entries includes precomputing a converge path.

26. The system of claim 24, wherein pre-computing entries includes precomputing a chain path.

* * * * *